United States Patent
Welch et al.

(10) Patent No.: US 7,267,310 B2
(45) Date of Patent: Sep. 11, 2007

(54) QUICK ADJUST SUPPORT SYSTEM WITH TRAPPED OR INTEGRAL WEDGE

(75) Inventors: Robert J. Welch, Dallas, PA (US); James D. Hill, Tolland, CT (US); Jeffrey C. Olson, Dallas, PA (US); Robert R. Steele, Sweet Valley, PA (US); Cheryl Kniffin, Mountaintop, PA (US); Katherine McGillivray, Marshall, MN (US)

(73) Assignee: Metro Industries Inc., Reno, NV (US)

( * ) Notice: Subject to any disclaimer, the term of this patent is extended or adjusted under 35 U.S.C. 154(b) by 0 days.

(21) Appl. No.: 11/445,365

(22) Filed: Jun. 1, 2006

(65) Prior Publication Data

US 2006/0226313 A1    Oct. 12, 2006

Related U.S. Application Data

(62) Division of application No. 10/713,235, filed on Nov. 14, 2003, now Pat. No. 7,086,633.

(60) Provisional application No. 60/426,009, filed on Nov. 14, 2002.

(51) Int. Cl.
*A47B 96/00*    (2006.01)

(52) U.S. Cl. .............................. 248/218.4; 108/147.13; 248/245

(58) Field of Classification Search ............. 248/218.4, 248/219.1, 219.4, 235, 242, 245, 250; 108/108, 108/107, 147.11, 147.12, 147.13, 147.14, 108/147.15, 147.16, 147.17
See application file for complete search history.

(56) References Cited

U.S. PATENT DOCUMENTS

| | | | |
|---|---|---|---|
| 3,424,111 A | 1/1969 | Maslow | 108/144 |
| 3,523,508 A | 8/1970 | Maslow | 108/144 |
| 4,596,484 A | 6/1986 | Nakatani | 403/104 |
| 4,811,670 A | 3/1989 | Kolvites et al. | 108/107 |
| 4,964,350 A | 10/1990 | Kolvites et al. | 108/110 |
| 5,271,337 A | 12/1993 | Kolvites et al. | 108/107 |
| 5,279,231 A | 1/1994 | Kolvites et al. | 108/107 |
| 5,415,302 A | 5/1995 | Carlson et al. | 211/187 |
| 6,017,009 A | 1/2000 | Swartz et al. | 248/245 |
| 6,126,127 A | 10/2000 | Riblet | 248/219.4 |

*Primary Examiner*—Ramon O Ramirez
(74) *Attorney, Agent, or Firm*—Fitzpatrick, Cella, Harper & Scinto

(57) ABSTRACT

A support system includes a support post and support means for adjustably supporting a member to the support post. The support means includes a locking mechanism movable between a first position for press-fitting the support means, directly or indirectly, against the support post and a second position for releasing the press-fitting. The locking mechanism has a surface that abuts the support post, or a wedge member associated with the support post, when in the first position thereby to effect the press-fitting and that is released from the support post when moved to the second position to release the press-fitting.

49 Claims, 30 Drawing Sheets

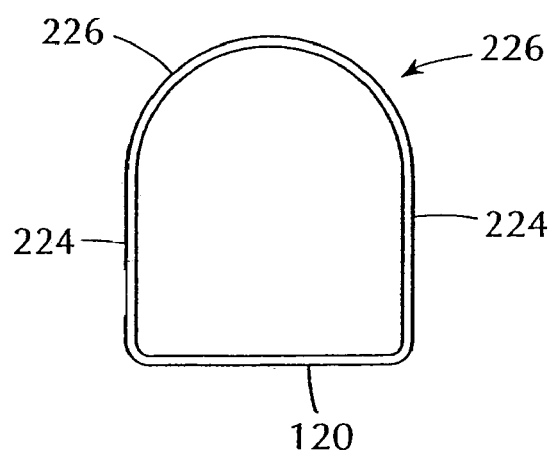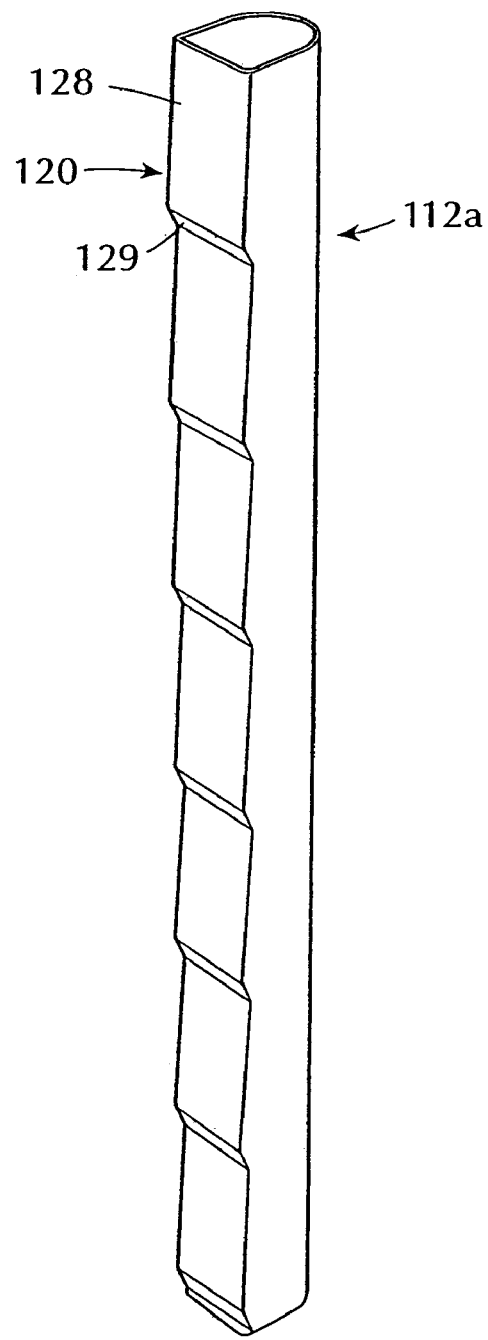

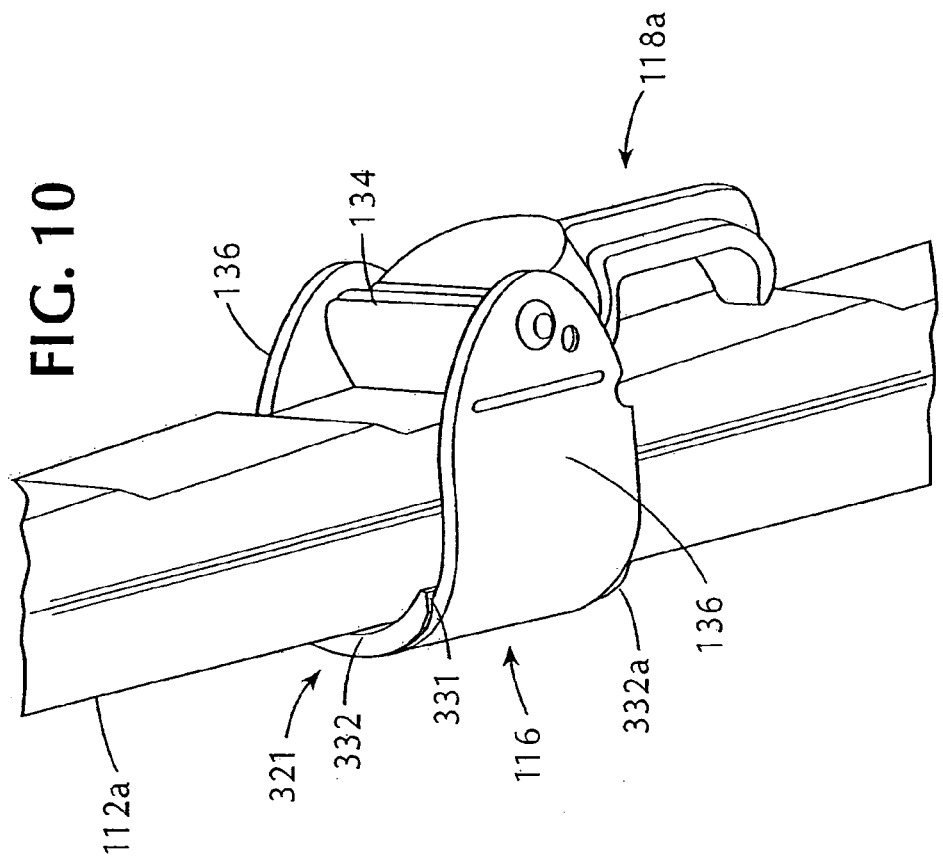
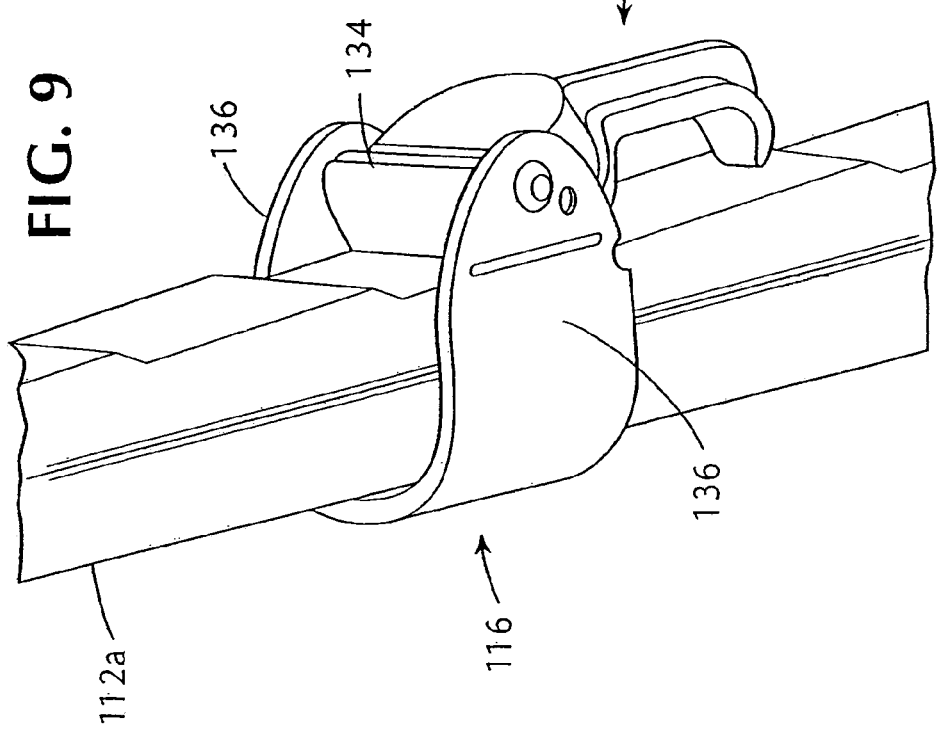

FIG. 11C-1
FIG. 11C-2
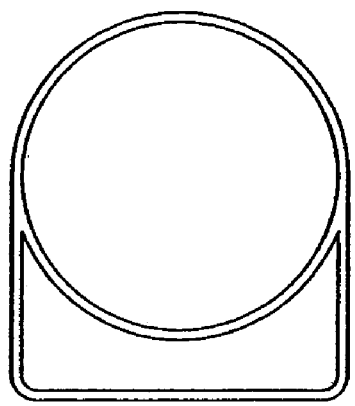
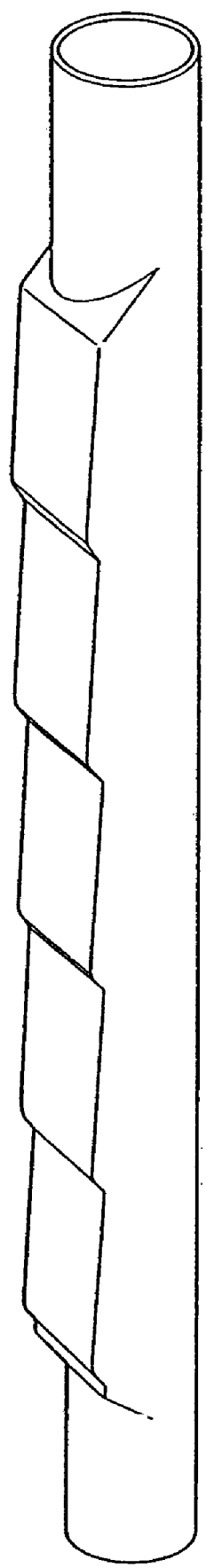

FIG. 11E-1
FIG. 11E-2
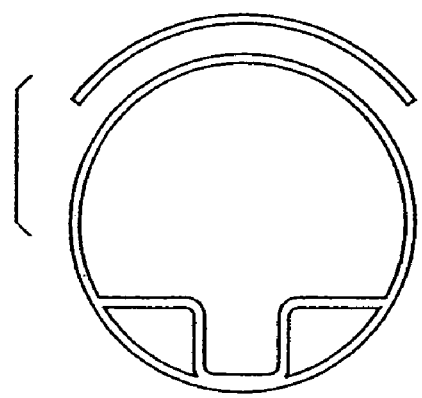
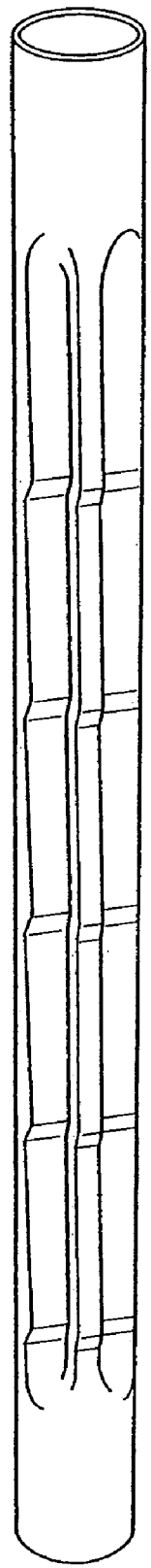

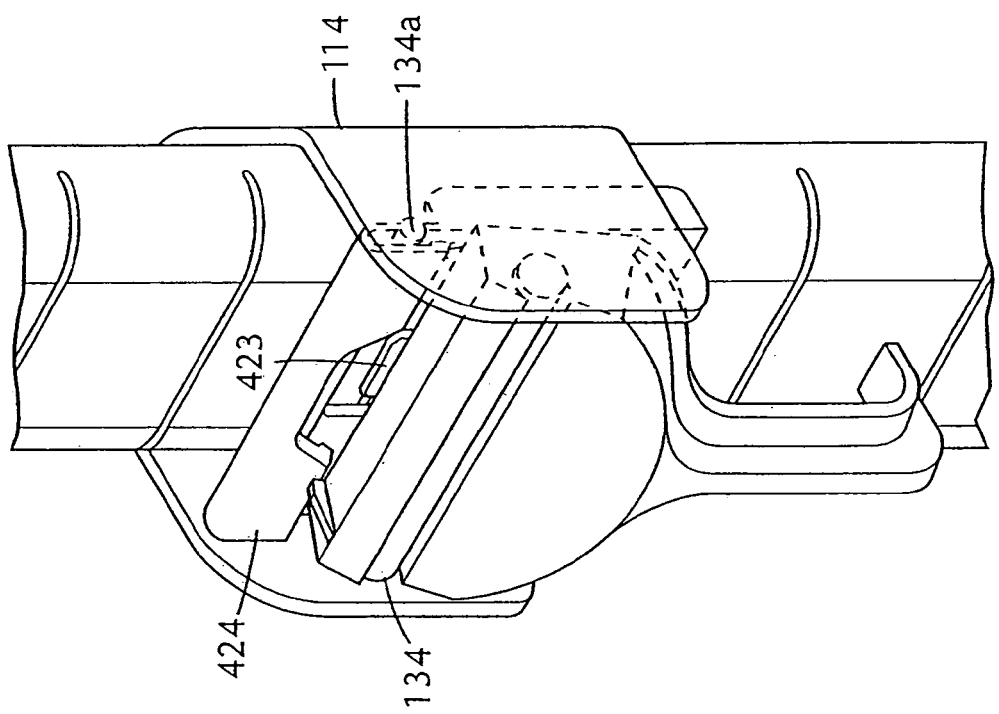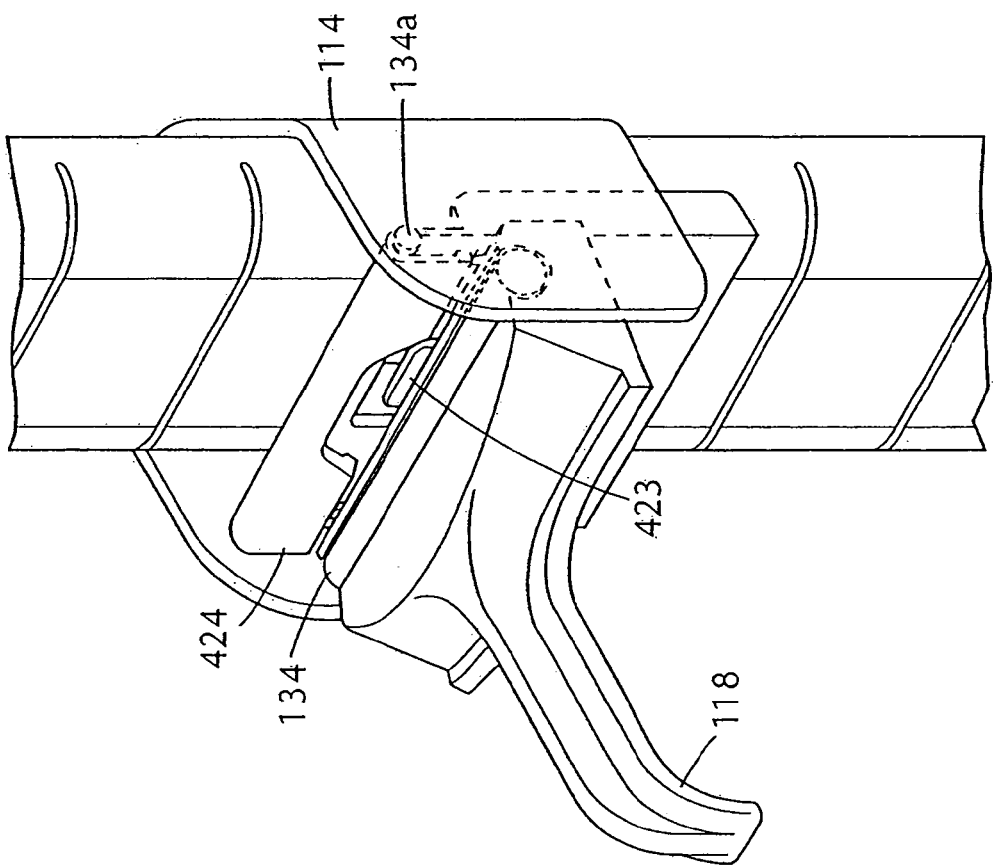

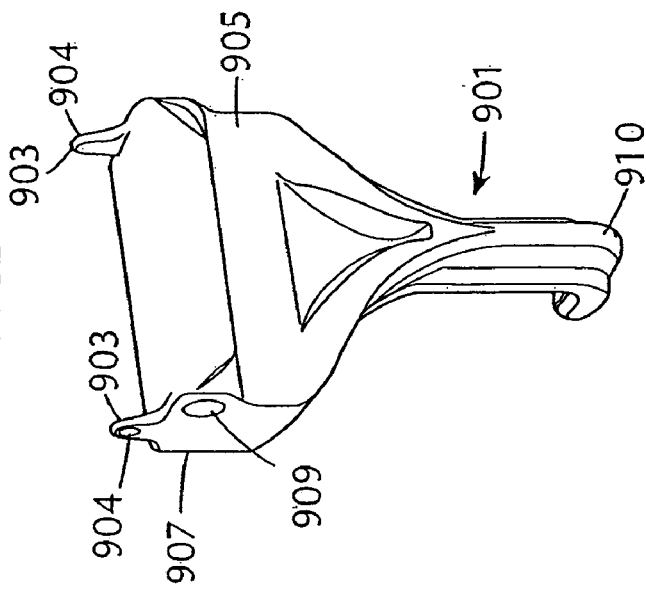
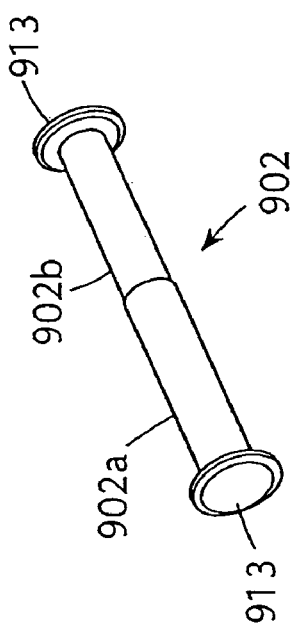
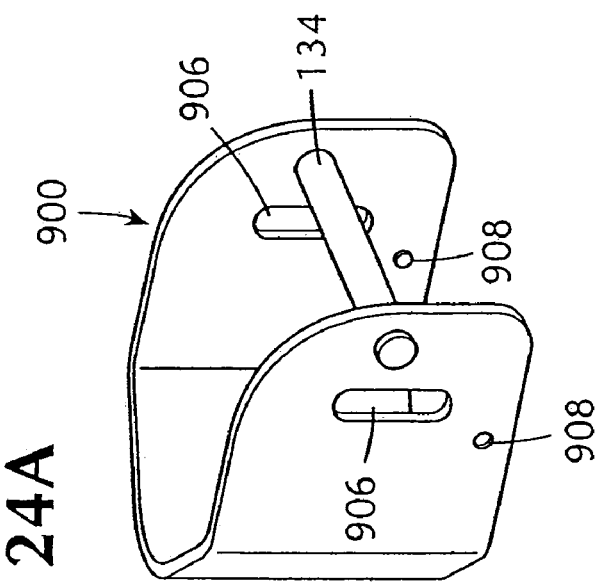
FIG. 24B
FIG. 24C
FIG. 24A

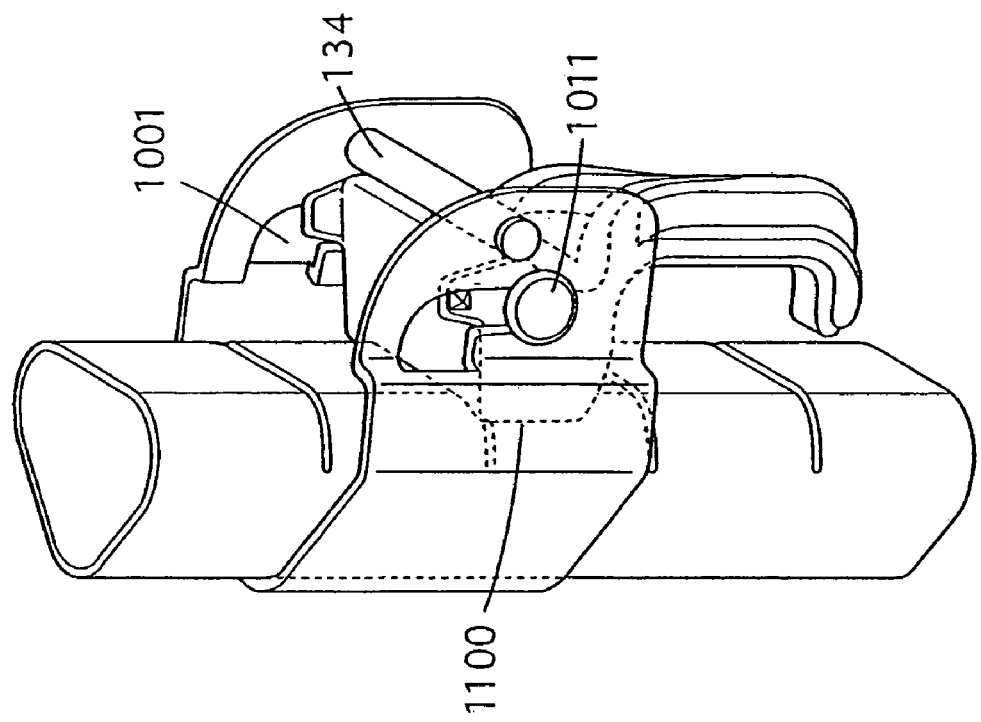
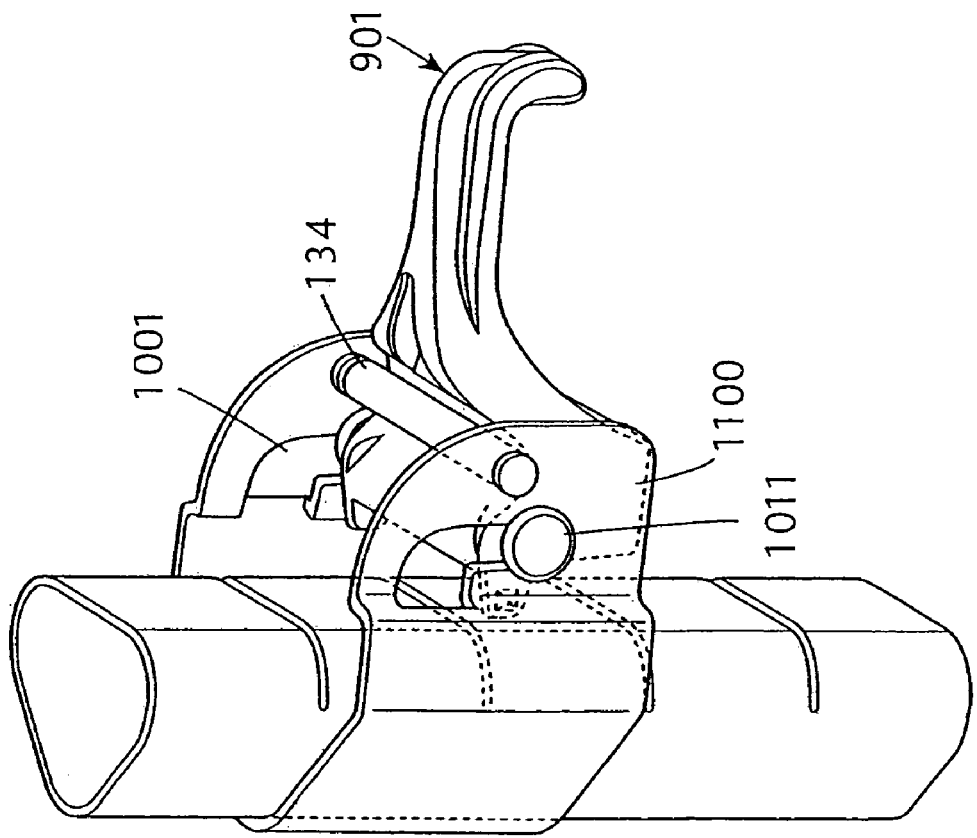

QUICK ADJUST SUPPORT SYSTEM WITH TRAPPED OR INTEGRAL WEDGE

CROSS-REFERENCE TO RELATED APPLICATIONS

This application is a division of U.S. application Ser. No. 10/713,235, filed Nov. 14, 2003 now U.S. Pat. No. 7,086,633, which claims priority to U.S. Provisional Patent Application No. 60/426,009, filed Nov. 14, 2002, and these applications are hereby incorporated by reference in their entirety.

BACKGROUND OF THE INVENTION

1. Field of the Invention

The present invention relates generally to an item-supporting structure that can be used to support shelving or other elements for carrying or supporting any desired item. More particularly, the present invention relates to a support assembly for use in, for example, a knock-down shelving system, to adjustably support shelves.

2. Description of the Prior Art

Shelving systems having adjustable height shelves and so-called "knock-down" type shelving systems are known, and each has utility in many applications. For example, a knockdown shelving system with adjustable height shelves may be used in food service, industrial, commercial, hospital, and similar fields for storage of any desired items.

One type of known adjustable, knockdown shelving system is disclosed in U.S. Pat. No. 3,424,111 (Maslow) and U.S. Pat. No. 3,523,508 (Maslow), which are assigned to the assignee of the subject invention. The adjustable shelving system disclosed in these patents has achieved great commercial success under assignee's trademark SUPER ERECTA SHELF. This shelving system uses a plurality of cylindrical support posts provided with a series of equally spaced, annular grooves on its outer surface. A basic shelving system might include four support posts to support one or more formed-wire shelves, with each shelf having a frusto-conically-shaped collar at each corner for receiving a support post. A two-piece interlocking sleeve fits around the support post. The sleeve features a rib on its interior surface for engaging one of the grooves on the support post and has a frusto-conically-shaped outer surface, which is widest at the bottom, designed to complement the shape of the shelf collars. The support posts fitted with sleeves are received in the collars of each shelf to assemble the shelving system. When assembled, the weight of the shelf creates a radially-inwardly directed force between the collars and sleeves. This force brings the sleeves into a locking relation with the posts and creates a wedging force between the collars and sleeves.

While the SUPER ERECTA SHELF shelving system has proven very successful in providing an easy to assemble shelving system with a substantial load-bearing capacity, adjusting the shelves can sometimes require the use of a hammer or other tool to disengage the shelf collars from the sleeves. The weight of the shelf and any items supported thereon, especially over time, can build up the wedging force between the shelf collars and the sleeves to the point where a significant amount of force is needed to raise the shelf off of the sleeves.

A shelving system with easy to adjust shelves is provided in U.S. Pat. No. 5,415,302. This shelving system uses hanger brackets to permit easy installation and adjustment of the shelves without requiring the disassembly of the entire shelving system or the use of tools. This shelving system is known commercially under the trademark QWIKSLOT SHELF, and the patent is also assigned to the assignee of the subject invention. The QWIKSLOT SHELF shelving system uses support posts formed with a plurality of elongated slots at regular vertical intervals for receiving the hanger brackets. The slotted support post can also have annular grooves as discussed above in the SUPER ERECTA SHELF shelving system. A notch in each hanger bracket receives a truncated corner of a shelf.

The hanger brackets used in the QWIKSLOT SHELF shelving system allow for easy adjustment of the shelves. A potential drawback in some applications, however, is that shelves secured by means of the hanger brackets do not provide the heavy-duty load bearing capacity of other shelving systems, such as the SUPER ERECTA SHELF shelving system. In addition, the slots in the posts are not acceptable in some food service applications.

Still another type of successful shelving system, sold and marketed under the trademark METROMAX features a "knock-down" configuration that uses triangular support posts. Such a system is the subject of U.S. Pat. No. 4,811,670, U.S. Pat. No. 4,964,350, U.S. Pat. No. 5,271,337, and U.S. Pat. No. 5,279,231, which also are assigned to the assignee of the subject invention.

In U.S. Pat. No. 4,811,670, a corner assembly for securing each corner of a shelf to the triangular support post includes a wedge member, a corner bracket structurally associated with the shelf and a collar. The wedge member snap-fits on the support post, and the collar and corner bracket form a sleeve around the support post. The formed sleeve fits against the support post and wedge member and supports the shelf by a wedging force.

The shelving systems in U.S. Pat. No. 4,964,350, U.S. Pat. No. 5,271,337, and U.S. Pat. No. 5,279,231, feature modular shelves in combination with the triangular support posts. The modular shelves include a rectangular shelf frame formed from two end beams connected to two side beams. A center beam may be inserted between the end beams, parallel to the side beams, to increase the load-bearing capacity of the system. A plurality of plastic shelf mats are adapted to be snap-fit onto the shelf frame. The shelf frame is secured to the support post by corner assemblies comprised of a corner portion of the end beam, a wedge member and a separate collar. A sleeve formed by the corner portion and the collar is seated on the support post and wedge member and secured by a wedging action. Two lock cylinders lock the collar to the corner portion to secure the sleeve.

While the design of the modular shelf provides many advantages, adjusting the shelf can, on occasion, require use of a hammer or other tool to disengage the formed sleeve from the wedge member for the same reasons discussed above in connection with the SUPER ERECTA SHELF shelving system.

U.S. Pat. No. 6,017,009 and U.S. Pat. No. 6,113,042, each of which are incorporated herein by reference and are similarly assigned to the assignee of the subject invention, feature a support system for supporting a member on a support post. The support system of these two patents is sold and marketed under the trademark SUPER ADJUSTABLE SUPER ERECTA and the former patent also relates to a system sold under the mark METROMAX-Q. These patents feature a wedge assembly having a tapered face mountable on the support post, a collar, secured to the member to be supported, for example shelves, and a locking mechanism rotatably supported by the collar. The locking mechanism has a first position for press-fitting the wedge assembly against the support post, and a second position for allowing the collar to slide over the support post. The wedge member has beads on an inner surface for mating with grooves provided at least partially around the periphery of the support post. When the locking mechanism is in the first position, the beads of the wedge and the grooves mate to provide a secure fit.

FIG. 1 illustrates one corner of a shelving system utilizing the support assembly in accordance with the METRO-MAX-Q system. In this figure, a wire shelf frame 10 is positioned on an elongated support post 12 by a corner support assembly 14.

Generally speaking, the corner support assembly 14 is comprised of a collar 16 and a locking mechanism, or flipper, 18 rotatably mounted to the collar. In this view, the flipper is shown in its unlocked position. The corner support assembly is secured between an end outer rail 24 and a side outer rail 24' which form part of the shelf frame 10. A tapered wedge member 20 is positioned on the post where the shelf frame is to be secured. With the flipper in the closed position, the wedge member is compressed against the support post 12, and the corner support assembly 14 surrounds the support post and wedge member like a sleeve and is seated thereon to support the shelf frame with a wedging force. In addition, as the shelf is loaded, the flipper and shelf will move downwardly relative to the wedge thereby to increase the force with which the wedge member engages the post.

As shown in FIG. 1, the wire shelf frame 10 is part of a modular shelf that is formed by securing the outer rails 24 and 24' to the corner support assemblies 14 by conventional means such as welding. In a rectangular shelf configuration, for example, two end outer rails 24 and two side outer rails 24' will be secured between four corner support assemblies to comprise the wire shelf frame. Each outer rail includes a top rail 26, a bottom rail 28 and a snake-like rail 30 secured between the top and bottom rails for stability. One or more transverse rails (unshown) can be secured between parallel outer rails for additional support and to increase the load-bearing capacity of the shelf.

FIG. 2 is an isolated view of the collar 16 as used in an exemplary disclosed embodiment of the METROMAX-Q system. The collar 16 includes a cylindrical shaft 34, preferably non-rotatable, secured between two lateral sides 36 for rotatably supporting the flipper 18. A rear section of the collar 16 joining, or connecting, the two lateral sides is contoured to fit the outward-facing shape of the post 12. The post has a generally triangular cross-section. The rear side is thus shaped to have a straight portion 35 angled from each lateral side and joined by a rounded apex 37.

FIG. 3 illustrates an exemplary locking mechanism, or flipper 18 as used in the METROMAX-Q system. The flipper, which is preferably integrally formed, has an upper end 41 and lower end 43. Further, the top end has a flat portion 47 and a rounded portion 49, with the rounded portion defining part of an open cylindrical cavity 40 for receiving and containing the shaft 34 of the collar 16. The lower end includes a flat manipulating portion 42 that can be grasped by the user. A rear face 44 of the flipper, which extends at an angle from the flat portion 47 and cannot be seen in FIG. 3, is shaped to complement the shape of the wedge member 20, which in this embodiment is substantially flat. The flipper is mounted on the collar to rotate about a longitudinal axis of the shaft. The preferred material for the flipper is a rigid molded plastic such as, for example, reinforced nylon.

FIG. 4A shows an example of a wedge member 20 used in the METROMAX-Q system. The wedge member 20 is designed to clip onto an interior face of the support post 12. The wedge member includes a front portion 45 flanked by two contoured lips 47 for clipping, or snap-fitting, the wedge member onto the support post. In addition, detent means such as internal beads, or ribs, 46 are provided on the internal surface of the wedge member and are spaced at intervals corresponding to the spacing of grooves on the support post.

The configuration of the internal beads is designed to mate with the configuration of the grooves in the support post. The internal beads provide vertical support when they are seated in the grooves of a support post. To further secure the wedge member on the support posts, additional vertical support is provided by a wedge action provided by the flipper in the locked position. The wedge member 20 may be clipped on to the support posts at any incremental height, and further may be translated up and down to any other incremental height.

In the example from the METROMAX-Q system illustrated in FIG. 4A, a cut-out 48 can be provided in the front portion 45 to view optional height increment numbers on the support post for vertically aligning the wedge member with wedge members on other support posts.

The outer surface of the front portion is substantially flat to correspond to the substantially flat rear face 44 of the flipper. Although not readily recognizable in FIG. 4A, the front portion is also slightly tapered from its upper end to its lower end, such that the lower end is wider and extends toward an interior of the shelving system.

With the tapered shape of the wedge member, an inwardly directed force is created by the weight of the shelf assembly to provide a wedging action between the corner support assembly and the wedge member, acting as in inclined plane.

As shown in FIG. 4B, the support post 12 has a generally right equilateral triangular cross-section, which can also be described as a triangular cross-section. A right-angled apex 50 and two flat exterior sides 52 face the exterior of the shelving system, and interior angled apexes 54 and an interior side 56 of the support post face the interior of the shelving assembly. The triangular geometry of the support post provides multi-directional stability, particularly in the directions of critical stress forces, i.e., in a direction parallel to the edges of the shelf.

The support post includes a plurality of horizontal grooves 58 that are preferably, but not necessarily, evenly spaced in the longitudinal direction of the post. The grooves receive the internal beads 46 of the sleeve.

Although unshown in the drawings, the top end of each support post 12 can be fitted with an end cap and the bottom end with a caster, a vertically-adjustable foot, an end cap, etc. As one example, the bottom end of the support post can be fitted with a stem receptacle for threadably receiving a leveling leg.

The METROMAX-Q system has been very successful and has provided users with an extremely easy to use yet sturdy adjustable mechanism for member support, in particular supports for heavy duty shelving requirements. This system can be improved so as to be even more convenient if a system can be devised in which the securing wedging action can be provided without using a separate wedge that may come loose from the other components of the corner support assembly. Thus, it would be advantageous if a support mechanism can be provided that has the advantages of the METROMAX-Q system mentioned above, while at the same time having the wedge, or structure that performs the wedging function of the wedge's inclined plane structure, inseparable or less readily separable from the other components of the corner support assembly.

SUMMARY OF THE INVENTION

For purposes of explanation, the present invention will be described with reference to a shelving system. However, in its broadest aspect, this invention relates to a support assembly capable of use in many types of support systems. The support system can support shelves, as described below in greater detail, and other elements for carrying a wide variety of items. For example, the support system can support combinations of shelving, drawers, work surfaces, racks, bins, hooks and the like.

Accordingly, it is a principal object of the present invention to provide a shelf support assembly for use in an easy to assemble and easy to adjust heavy-duty shelving system.

Another object of the present invention is to provide a shelf support assembly that can be quickly and easily adjusted.

It is another object of the present invention to provide a shelf support assembly that is statically secured to the shelving system to provide substantial load-bearing capacity.

Still another object of the invention is to provide a shelf support assembly that is readily adaptable to various types of support posts.

Another object of the invention is to provide a support assembly that ensures a secure fit to a support post without the need for wedges that my come loose during adjustment, assembly or disassembly.

In accordance with one aspect of the present invitation, there is provided a support system, comprising a support post having a tapered face; and support means for adjustably supporting a member to the support post. The support means includes a locking mechanism movable between a first position for press-fitting the support means against the tapered face of the support post and a second position for releasing the press-fitting. The locking mechanism has a surface that abuts the tapered face of the support post when in the first position thereby to effect the press-fitting and that is released from the tapered face of the support post when moved to the second position to release the press-fitting.

Also in accordance with the above aspect, there is provided a system for supporting a member. The system comprises a support post having a longitudinal axis and a tapered face; and support means adapted to be secured to the member, for supporting the member to the support post. The support means forms a sleeve around the support post and seated on the support post on the tapered face thereof. The support means includes a locking mechanism that is actuatable between a first position compressing the tapered face and supporting the member and a second position not compressing the tapered face.

In accordance with a second aspect of the invention, a support system comprises a support post, a wedge assembly having a tapered portion, mounted on the support post, and support means for adjustably supporting a member to the support post. Also provided is securing means for securing the wedge member and the support means to one another.

The support means can include a locking mechanism having a first position for press-fitting against the wedge assembly and a second position for releasing the press-fitting.

In accordance with the second aspect, there is provided a support system, comprising a support post; a wedge member, having a tapered portion, located on the support post, the wedge member having a securing portion; and support means for adjustably supporting a supported member to the support post. The support means includes a locking mechanism movable between a first position for press-fitting the wedge member against the support post and a second position for releasing the press-fitting. The locking mechanism has a surface that abuts the wedge member when in the first position thereby to effect the press-fitting and that is released from the wedge member when moved to the second position to release the press-fitting. The locking mechanism cooperates with the securing portion of the wedge member so that the wedge member and the support means remain engaged with one another even when the support means is in the second position.

In accordance with a third aspect of the invention, a system for supporting a member comprises a support post, a collar secured to the member to be supported, and a locking mechanism. The locking mechanism has a first surface for abutting the support post in a first, unlocked position, and a second surface for, in a second unlocked position, press-fitting against the support post.

The locking mechanism may be mounted to the collar, and may be actuatable between a first position compressing the support post and a second position not compressing the support post.

In accordance with the third aspect, there is provided a support system, comprising a support post; and support means for adjustably supporting a member to the support post. The support means includes a locking mechanism, which includes an integrally formed wedging member. The locking mechanism is movable between a first position for press-fitting the wedging member against the support post and a second position for releasing the press-fitting. The wedging member has a surface that abuts the support post when in the first position thereby to effect the press-fitting and that is released from the support post when moved to the second position to release the press-fitting.

These and other objects, aspects, features and advantages of the present invention will become apparent from the following detailed description of the preferred embodiments taken in conjunction with the accompanying drawings.

BRIEF DESCRIPTION OF THE DRAWINGS

FIGS. 8A and 8B are a perspective view and top plan view, respectively, of a support post in accordance with a second embodiment of the first aspect of the present invention;

FIG. 9 is a partial perspective view of a support post/support assembly in accordance with the second embodiment of the first aspect of the present invention;

FIG. 10 is a partial perspective view of a support post/support assembly in accordance with the second embodiment of the first aspect of the present invention with a sleeve;

FIGS. 11A-1 and 11A-2 are perspective and plan views, respectively, of a support post according to the first aspect of the present invention, as manufactured by the hydro-forming process;

FIGS. 11B-1 and 11B-2 are perspective and plan views, respectively, of a support post according to the first aspect of the present invention, as manufactured by the pultrusion process;

FIGS. 11C-1 and 11C-2 are perspective and plan views, respectively, of a support post according to the first aspect of the present invention having a D-shaped cross-section, as manufactured by the hydro-forming process;

FIGS. 11D-1 and 11D-2 are perspective and plan views, respectively, of a support post according to a variation of the first aspect of the present invention, as manufactured by the rolled-form process;

FIGS. 11E-1 and 11E-2 are perspective and plan views, respectively, of a support post according to the variation of the first aspect of the present invention shown in FIGS. 11D-1 and 11D-2, as manufactured by the hydro-forming process;

FIGS. 15A and 15B are partial perspective views of the support assembly in accordance with the second embodiment of the second aspect of the present invention, in the unlocked and locked positions, respectively;

FIGS. 24A, 24B and 24C are perspective views of a collar, flipper and support pin, respectively, in accordance with the second embodiment of the third aspect of the present invention;

FIGS. 27A and 27B are partial perspective views of a support assembly in accordance with the third embodiment of the third aspect of the present invention, in the unlocked and locked positions, respectively.

DESCRIPTION OF THE PREFERRED EMBODIMENTS

Figure 1:
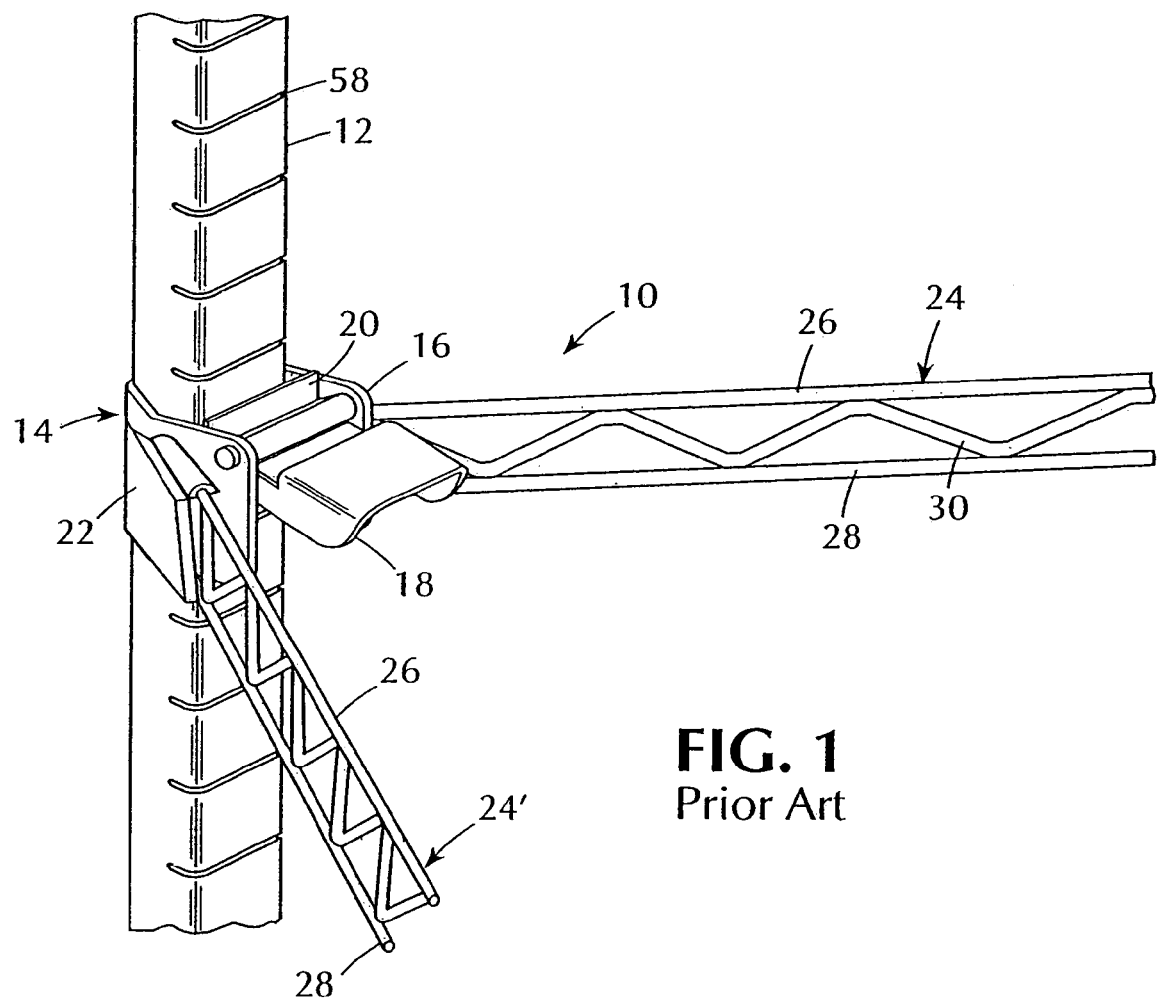
FIG. 1 is a partial perspective view of a shelving system in accordance with an exemplary embodiment of the prior art METROMAX-Q system.

The support assembly of the present invention can ideally be incorporated into a knock-down shelving system that includes a plurality of support posts for supporting one or more shelves at corner support assemblies thereof. The shelving system may include a structure to provide an inclined plane surface for use, in combination with a corner support structure, to provide a wedging force to support the shelves in relation to the support posts. The inclined plane structure can be provided by means of inclined plane structures formed integrally with the support post and to which the corner assembly engages to effect a press fit, a snap-on wedge member with detent means for adjustably locating the wedge member at predetermined heights on the support post and having securing means for trapping the wedge member within a corner support assembly, or an inclined plane structure integrally formed within the structure of the corner support assembly itself.

In accordance with the present invention, each corner support assembly features a collar, which is structurally associated with the shelf, and a locking mechanism, or flipper, rotatably supported by the collar and actuatable between a locked position and an unlocked position. In the unlocked position, the corner support assemblies allow the shelf to translate relative to the support posts.

In accordance with a first aspect of the present invention, when the flippers are locked, the collars are secured to each respective post, by a wedging action, against inclined plane portions of the support post. In accordance with the first aspect, the post is formed with a sawtooth or other appropriate profile to provide the inclined plane, or tapered, portions of the post. In each corner support assembly, the flipper and collar, in the locked position, are secured tightly against an inclined portion of the post, obviating the need for a discrete wedge member.

In accordance with a second aspect of the present invention, each corner support assembly includes a collar, flipper and wedge member. When the flippers are locked, the collars are secured against the wedge members and the support posts by a wedging action, the wedge member and collar of each corner support assembly being structured such that the wedge member is captured within the corner support assembly.

In accordance with a third aspect of the present invention, the flipper, or flipper in combination with the collar, are structured so as to perform the inclined plane function and provide a securing wedging action against the post, in the locked position.

Operation of the flipper in any of the above aspects thus permits easy height adjustment of the shelf without the need for tools, and also without compromising the load bearing capacity of the shelving system. In particular, such operation may be achieved without confronting the problem of loose wedge members.

Throughout, like reference numerals will be used to describe like structures. Moreover, the corner collars generally will be illustrated without showing the members to be supported, e.g., shelving braces, that will typically extend therefrom. In a shelving system, for example, such structure will be similar to the top rail 26, bottom rail 28 and snake-like rail 30 shown in prior art FIG. 1. When shown in other drawings, these reference numerals will be maintained.

For purposes of explanation only, and to illustrate in part how the present invention may be adapted easily to conventional shelving technology, the support assembly of the present invention will be described below in use with a knock-down shelving system. The shelving system generally includes a plurality of support posts, e.g., four, arranged to support one or more shelves at corner assemblies thereof. Of course, the support assembly of the present invention can be used in various types of support systems, e.g., cabinets, closets, etc., with a shelving system being only one example thereof. Moreover, the support assembly can be used in conjunction with many shelf embodiments and is not limited to use with a corner of a shelf or, for that matter, a corner of any supported member. In the examples given below, the support assembly is structurally associated with a wire shelf frame designed to be fitted with plastic shelf mats. However, the support assembly of the present invention will be readily adaptable to many other shelf embodiments including, but not limited to, a wire shelf or a solid sheet metal shelf.

The present invention generally relates to an improved support system that builds on the advantageous structures introduced by the METROMAX-Q system described above in relation to FIGS. 1-4. As discussed above, in the METROMAX-Q system, a wedge member is used that provides an inclined plane surface to provide a tight rigid joint between the post and the support assembly, including the collar and the flipper. However, the wedge member may become separated during adjustment, assembly/disassembly or shipping. In accordance with the present invention, to avoid having loose wedges, the inclined plane surface is advantageously integrally formed in one of the post, flipper or collar, or it is attached thereto, i.e., captured, so that it does not become loose. In the first aspect, illustrated in FIGS. 5-11, the support post itself is formed so as to have integrally formed tapered portions extending therefrom, which themselves provide the function of the inclined plane, that is, the function performed by the wedge member in the METROMAX-Q system. In accordance with the second aspect, illustrated in FIGS. 12-21, a wedge member is used to provide the function of the inclined plane, but unlike in the METROMAX-Q system, the wedge member is formed so as to be captured, in various ways described and illustrated in detail below, within the structure of the collar and/or flipper. In accordance with the third aspect, illustrated in FIGS. 22-27, the flipper and/or collar is provided with structure that performs the inclined plane function of the wedge, obviating the need for a distinct wedge member.

In the various embodiments of the present invention described below, the locking mechanism, or flipper, will be shown variously as having a rounded lower portion or an elongated lower portion forming a handle. Such depictions are for illustrative purposes only. As will be understood, the lower portion of the locking mechanism, or flipper, may be in any embodiment rounded, flat, or elongated, without departing from the scope of the present invention.

Figure 5A:
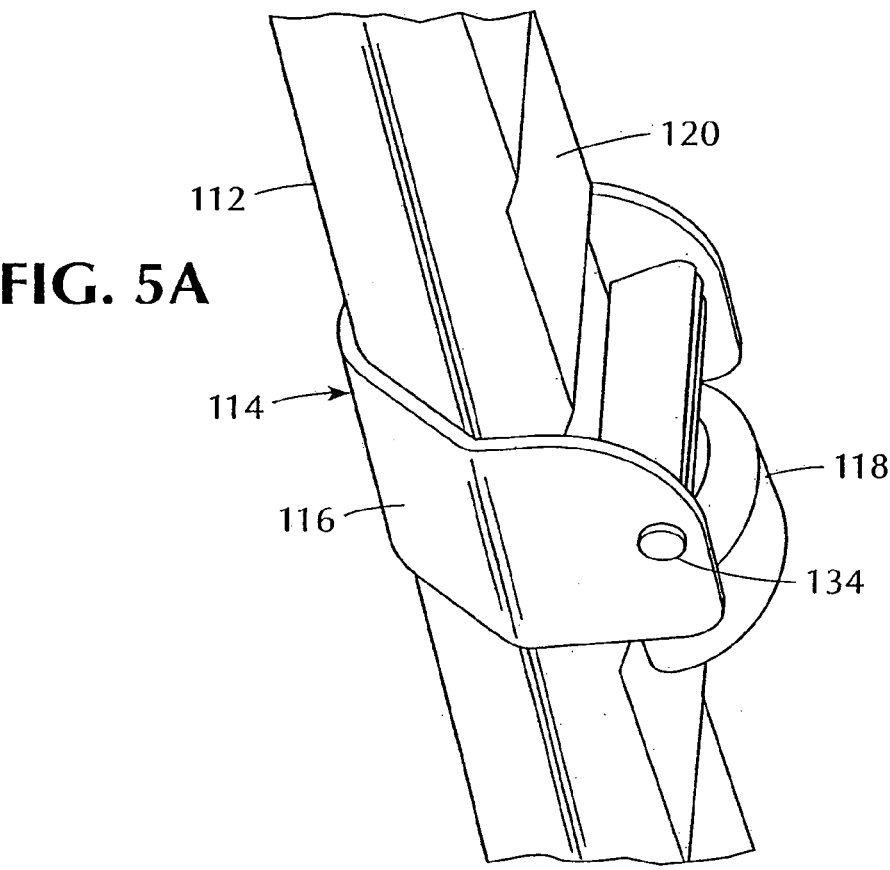
FIG. 5A a partial perspective view of the support post/ support assembly in accordance with a first embodiment of a first aspect of the present invention.
Figure 5B:
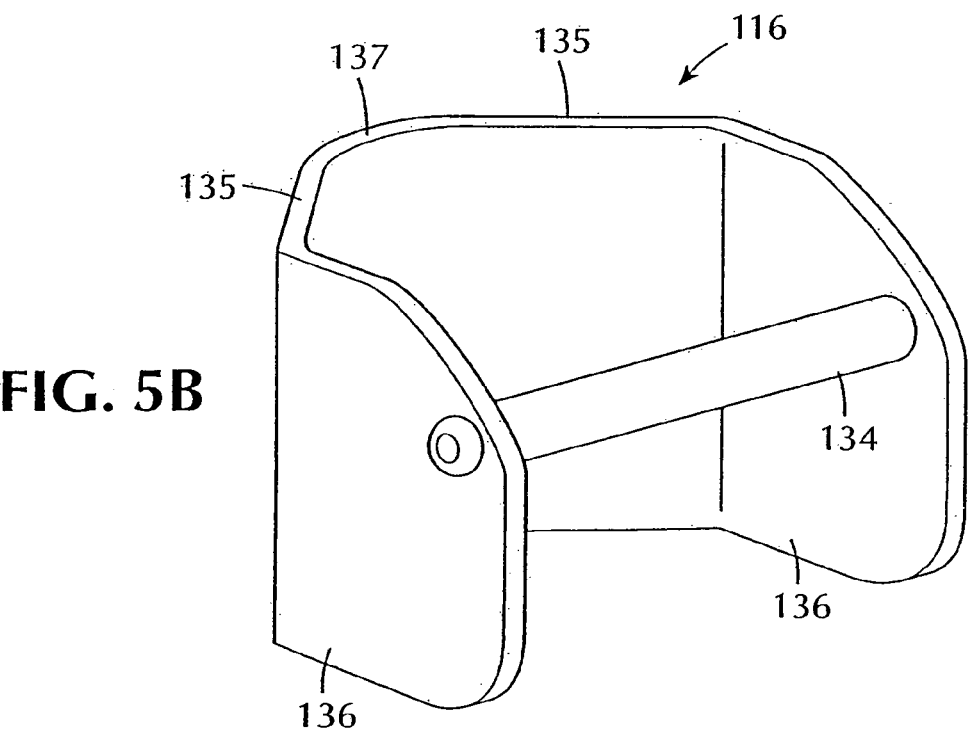
FIG. 5B is perspective view of the collar shown in FIG. 5A in accordance with the first embodiment of the first aspect of the present invention.
Figure 6A:
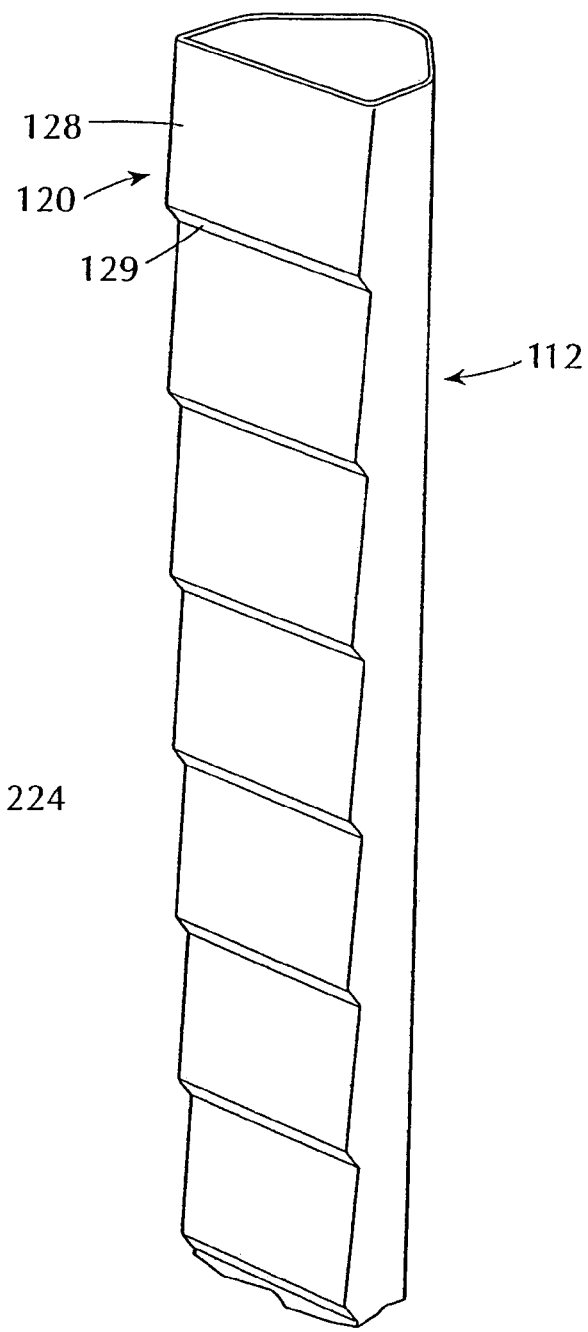
FIG. 6A is a perspective view of the support post in accordance with the first embodiment of the first aspect of the present invention.
Figure 6B:
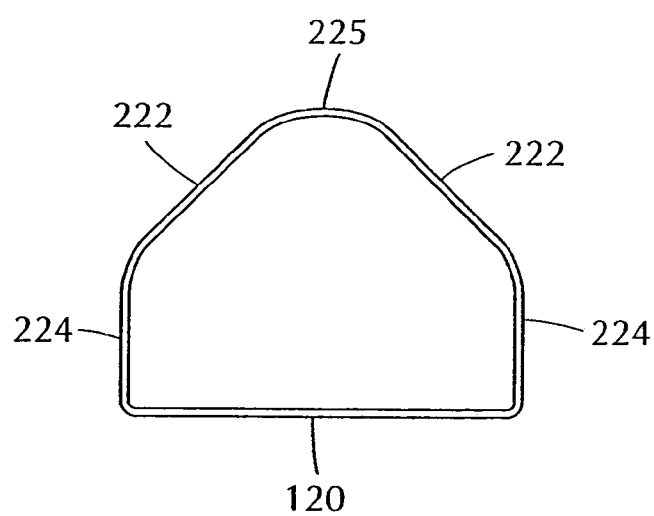
FIG. 6B is top plan view of the support post shown in FIG. 6A in accordance with the first embodiment of the first aspect of the present invention.

FIGS. 5A and 5B show a support means or assembly in accordance with a first embodiment of the first aspect of the present invention. In accordance with this embodiment, support post 112, which may be formed in a number of cross-sectional shapes, materials and manufacturing methods, to be discussed below in detail, is shaped so as to have a sawtooth profile, with tapered protruding faces 120. The tapered faces 120 are tapered outwardly from the post from top to bottom to form plural inclined planes. An exemplary vertical support post 112 in accordance with the first embodiment is shown in FIGS. 6A and 6B. As best seen in FIG. 6B, in this embodiment the support post 112 has a generally triangular cross-section. Of course, due to the tapered profile of the support post, cross-sections would differ in size depending upon where on the taper the cross-section is taken. For all tapered post cross-sections, the sections will be assumed to be taken at the largest portion of the tapered portions, although the figures are not to scale. As can be seen in FIG. 6B, straight portions 222 angle from lateral sides 224, the straight portions 222 joined by a rounded apex 225, all of which face the exterior of the shelving system. A front face 120, at right angles in cross-section to each lateral side 224, faces the interior of the shelving.

Although unshown in the drawings, the top end of each support post 112 can be fitted with an end cap and the bottom end with a caster, a vertically-adjustable foot, an end cap, etc. As one example, the bottom end of the support post can be fitted with a stem receptacle for threadably receiving a leveling leg. This applies to all embodiments and all aspects of the present invention.

As can be clearly seen in FIG. 6A the support post 112 has a sawtooth profile and includes, in a preferred embodiment, a plurality of inclined plane tapered faces 120. The tapered faces 120 preferably, but not necessarily, are spaced evenly vertically along the post. Each tapered face 120 comprises an outwardly tapered longer face 128, and an inwardly tapered shorter face 129.

In this regard, as is best shown in FIG. 5A, in this embodiment the collar 116 and locking mechanism, or flipper 118 together form a sleeve or corner support assembly 114 that fits over the support post. The flipper 118 preferably is of a construction substantially similar to the flipper of the METROMAX-Q system described in detail above. As in that system, the flipper 118 is mounted on the collar 116 to rotate about a longitudinal axis of the shaft 134. The flipper is movable between an unlocked position and a locked position. When the flipper is in the locked, or first, position, the rear face of the flipper directs an inward radial compression force against the inclined plane tapered face 120 to effect a press-fitting of the support assembly 114 against the tapered face 120. In addition, the tapered shape of the tapered face 120 creates an inwardly directed force by the weight of the shelf assembly to provide a wedging action between the corner support assembly and the tapered face 120. Movement of the flipper to the unlocked, or second, position releases the press-fitting.

As was discussed above with reference to FIGS. 6A and 6B, and as shown in detail in FIG. 5B, the collar 116 includes a securing means comprising a cylindrical shaft 134, preferably non-rotatable, secured between two lateral sides 136 for rotatably supporting the flipper 118. In accordance with all aspects the present invention, a rear section of the collar 116 joining, or connecting, the two lateral sides is contoured to fit the outward-facing shape of the post 112. In the present embodiment, the post has a generally triangular cross-section as discussed in detail above. The rear side of the collar 116 is thus shaped to have a straight portion 135 angled from each lateral side and joined by a rounded apex 137. As will be developed below, however, it will be appreciated that the rear side of the collar can easily be shaped to have any configuration, such as D-shaped, to match the shape of the support post.

Figure 3:
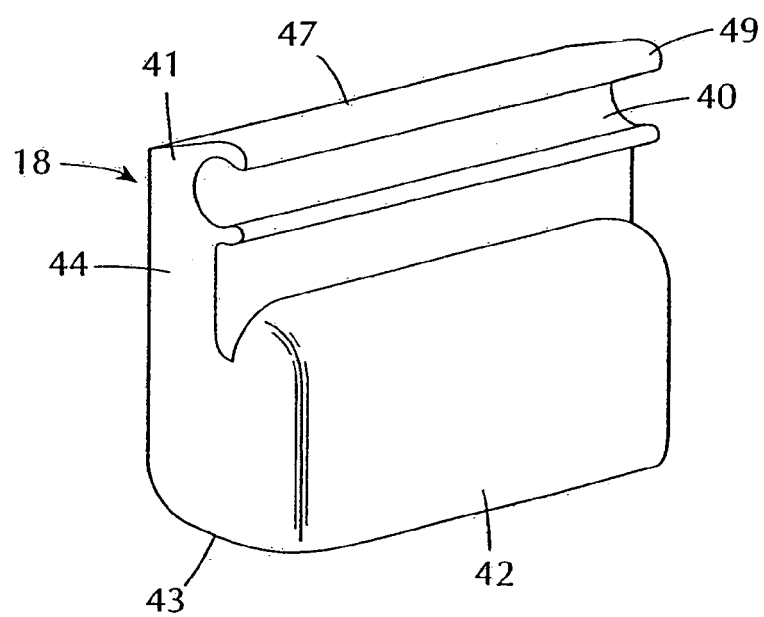
FIG. 3 is a perspective view of a flipper in accordance with an exemplary embodiment of the prior art METRO-MAX-Q system.
Figure 4A:
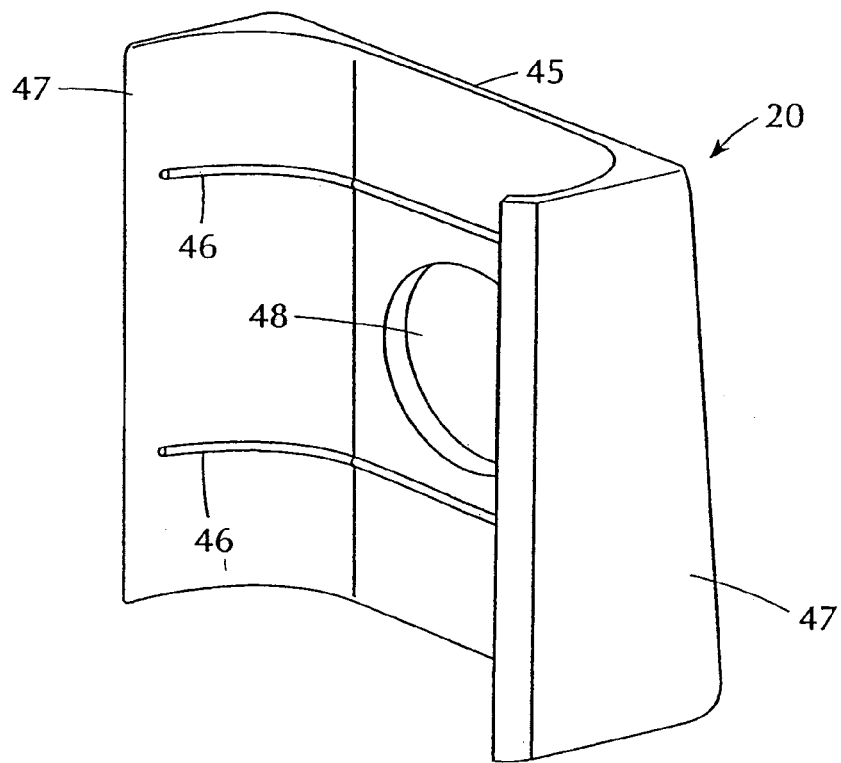
FIG. 4A is a perspective view of a wedge member in accordance with an exemplary embodiment of the prior art METROMAX-Q system.
Figure 4B:
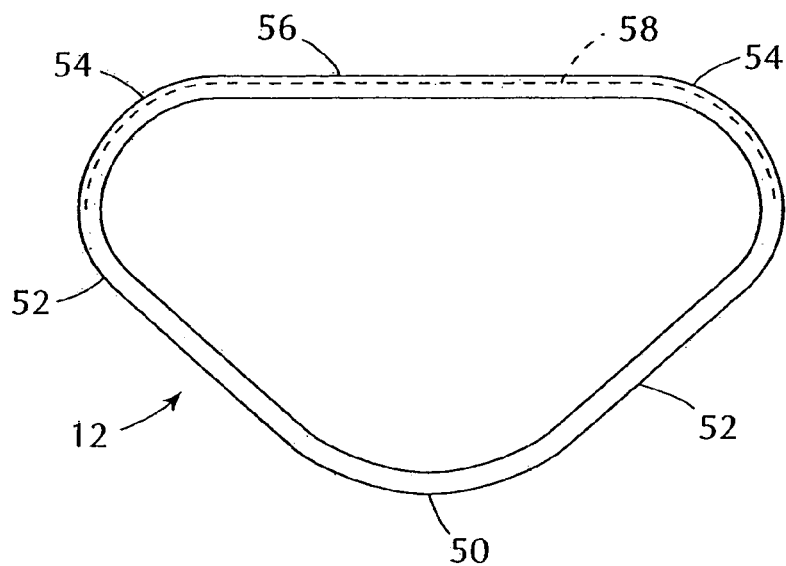
FIG. 4B is a top plan view of the support post shown in FIG. 1 in accordance with an exemplary embodiment of the METROMAX-Q system.
Figure 5C:
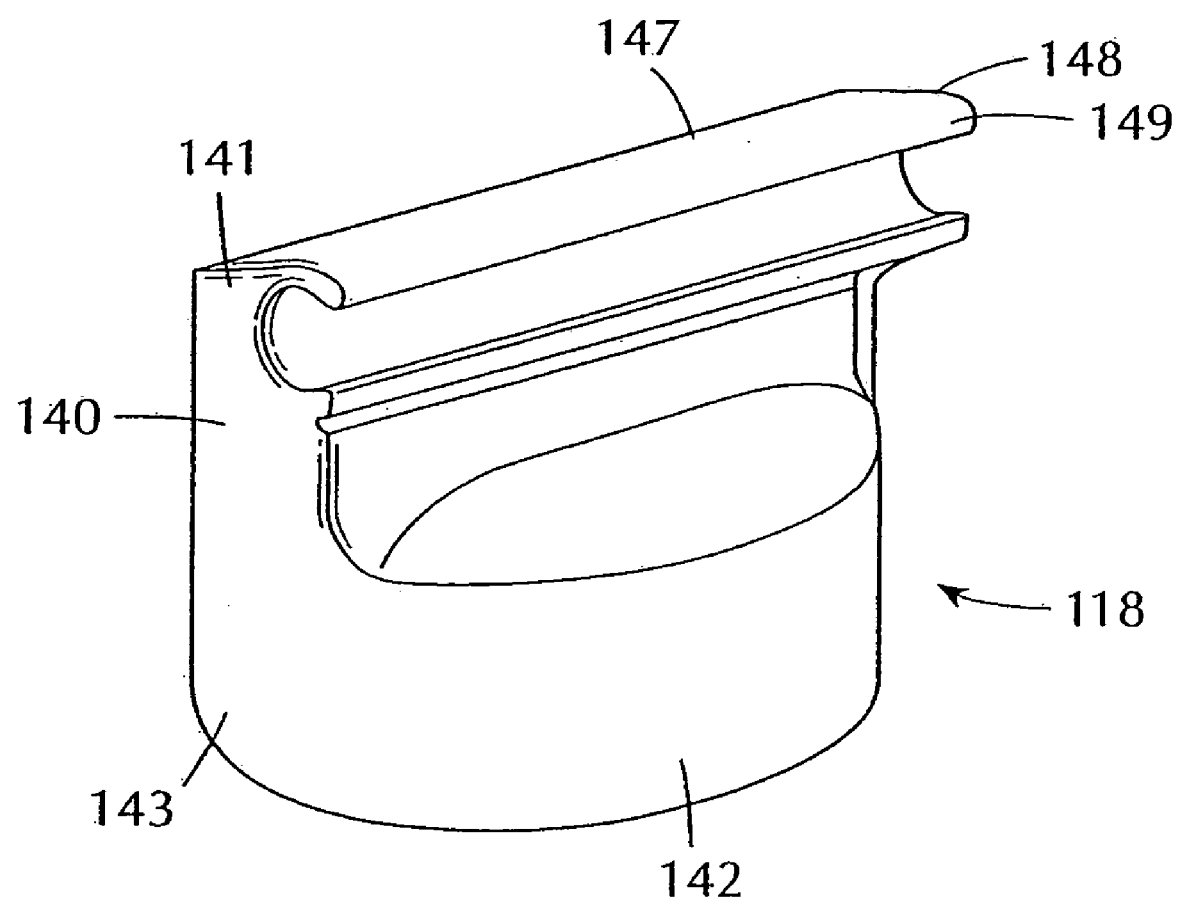
FIG. 5C is a perspective view of the flipper shown in FIG. 5A in accordance with the first embodiment of the first aspect of the present invention.

FIG. 5C illustrates the flipper 118 in accordance with a first embodiment of the subject invention. The flipper, which is preferably integrally formed, has an upper end 141 and lower end 143. Further, the top end has a flat portion 147 and a rounded portion 149, with the rounded portion defining part of an open cylindrical cavity 140 for receiving and containing the shaft 134 of the collar 116. In addition, a preferably flat transition portion 148 exists between the flat and rounded portions 147 and 149, respectively. The primary difference of the flipper in this embodiment from that shown in FIG. 3 is that its bottom end 143 is rounded instead of flat. That is, the lower end 143 includes a preferably rounded manipulating portion 142 for grasping by the user. A rear face 144 of the flipper, which extends at an angle from the flat portion 147, and which cannot be seen in FIG. 5C, is shaped to complement the shape of the tapered portion 120, which in this embodiment is substantially flat in the horizontal direction. The flipper is mounted on the collar to rotate about a longitudinal axis of the shaft. The preferred material for the flipper is a rigid molded plastic such as, for example, reinforced nylon.

By virtue of the taper of inclined plane portions of the posts, the weight of the shelf assembly creates an inwardly directed force to provide a wedging action between the corner support assembly and the support post.

Figure 7A:
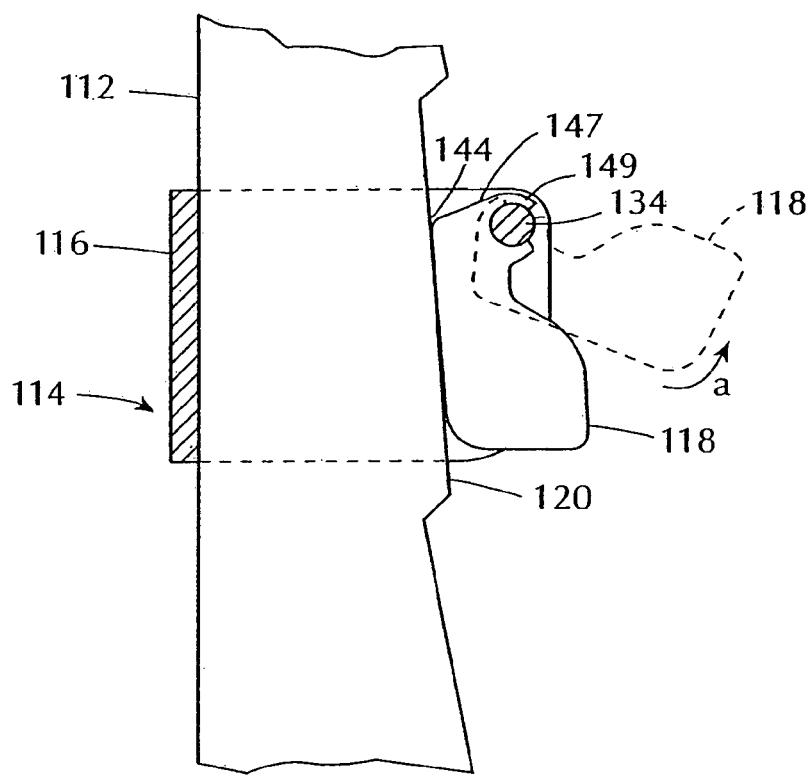
FIG. 7A is a partial side elevational view, partially in cross-section, of the support post and corner assembly in accordance with the first embodiment of the first aspect of the present invention.
Figure 7B:
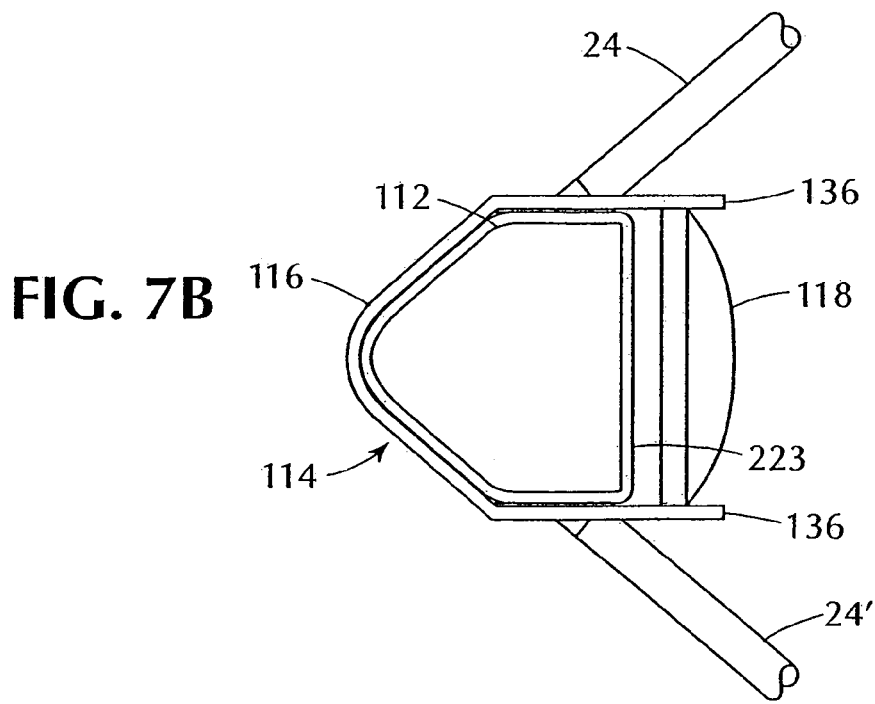
FIG. 7B is a partial top plan view of the support post and corner assembly in accordance with the first embodiment of the first aspect of the present invention.

FIGS. 7A and 7B illustrate how the collar support assembly 114 is secured to the support post 112. For the sake of simplicity, the outer rails 24 and 24' have been deleted in FIG. 7A but are shown to be secured to the lateral sides 136 of the collar 116 in FIG. 7B. In operation, the corner support assembly 114 is positioned over a selected tapered face 120 of the support post. In this regard, the collar 116 and flipper 118 together form a sleeve that fits over the tapered face of the support post. When the flipper 118 is in the closed, or locked, position as shown in solid lines in FIG. 7A, the rear face 144 of the flipper directs an inward radial compression force against the tapered face 120. In addition, the tapered shape of the tapered face 120 creates a wedge action between that face and the flipper for supporting the shelf assembly. It will be appreciated that the greater the weight on the shelf, the greater the downward force and thus the greater the wedging force.

FIG. 7A will also be referred to in discussing two salient features of the present invention. The first feature relates to the ability of the flipper to easily and quickly release the wedging action between the corner support assembly and the tapered face 120. This frees the shelf to slide up or down the support posts. To release the wedging action, the closed flipper 118 is rotated in the counter-clockwise direction of arrow a to its unlocked position as represented by the dashed lines. By pivoting the flipper about the shaft 134 in this manner, the compression force between the flipper 118 and the tapered face is released. Actuation of the flipper by the user thus allows for quick and reliable releasing of the wedging action.

Another salient feature of the invention is directed to the ability of the flipper to allow the corner support assembly to slide over the support post having the tapered faces 120. At rest, the flipper 118 normally hangs, by gravity, in substantially the same position shown in solid lines in FIG. 7A, i.e., with the lower end 143 directed downwardly. Now, with the flipper in this position and the corner support assembly disposed below a tapered face of the support post, when the shelf is raised toward the tapered face, the lower (and wider) end of the tapered face will initially contact the flat portion 147 of the upper end of the flipper, causing it to rotate counter-clockwise about the shaft 134 in the direction of arrow a. This action raises the flipper toward its unlocked position, whereby the rounded portion 149 of the upper end is substantially opposite the tapered face 120. As the flipper is biased toward its unlocked position, the contour of the upper end allows the flipper to pass completely over the tapered face.

The above-described embodiment in which the inclined plane in formed integrally with the support post is not limited to the specific example shown in the figures. Support posts of varying configurations may be used, with corresponding changes in the shape of the collar and/or flipper.

For example, FIGS. 8A and 8B illustrate a second embodiment of the first aspect of the present invention in which a support post 112a has a D-shaped cross-section. As best seen in FIG. 8B, in this embodiment, the support post 112a has a generally D-shaped cross-section. Arcuate cross-sectional portion 226 extends rearwardly from lateral sides 224, all of which face the exterior of the shelving system. A front face 120, at right angles to each lateral side 224, faces the interior of the shelving.

A corner support assembly suitable for use with the support post having the D-shaped cross-section is illustrated in FIG. 9. As in the case of the triangular cross-section support post, the collar 116 includes a cylindrical shaft 134, preferably non-rotatable, secured between two lateral sides 136 for rotatably supporting the flipper 118a. In accordance with the present invention, a rear section of the collar 116 joining, or connecting, the two lateral sides is contoured to fit the outward-facing shape of the post 112a. In this embodiment, the post has a generally D-shaped cross-section. The rear side of the collar 116 is thus shaped to have a rounded apex angled from each lateral side so that the collar secures tightly against the arcuate outer portion of the post 112a.

The flipper 118a functions in exactly the same way as flipper 118 discussed above except that flipper 118a is shown having a extended handle 320, which allows a user to grasp the flipper more easily, and requires less pull force to open. In all other primary aspects, the flipper 118a has the same shapes and characteristics as disclosed in the previous embodiment and is rotatably secured about the cylindrical shaft 134 on the collar 116. Thus, it will be appreciated that the flipper having the extended handle may be used in the corner support assembly discussed previously, and the flipper discussed in those figures may be used in the corner assembly for the support post having the D-shaped cross-section, without departing from the inventive concept.

On some shelving systems, the support posts and/or collars may be made of chrome-plated steel. Such chrome plating tends to have a relatively high coefficient of friction such that when the flipper is released from the locked position, it may be difficult to move the shelf to a new desired position. Therefore, the corner support assembly of the present invention may be provided with an optional fitting sleeve 321, that fits on the outer portion of the post between the corner support assembly and the post. FIG. 10 shows the corner assembly of FIG. 9 with a sleeve 321 placed between the collar and the support post. The fitting sleeve 321 has a curved portion 331, an upper lip 332 and a lower lip 332a. The upper land lower lips secure the sleeve in the collar, preventing it from translating vertically with respect to the collar. The sleeve is preferably made of a resin material having a relatively low coefficient of friction that may more easily be slid on the post when the flipper is released to ease adjustment of the location of the shelf. In all other ways, the corner assembly of FIG. 10 is identical to that shown in FIG. 9. It will be appreciated that a fitting sleeve can be used to make adjustment of shelf location easier in any embodiment of any aspect of the present invention, and will function exactly as described above.

Support posts in accordance with the first aspect can be of a variety of cross-sections and can be manufactured by a variety of different methods. The posts are preferably made of steel, other appropriate metal, or composites such as those formed by the pultrusion process for support posts. In the illustrated embodiments above, the drawings are consistent with a manufacturing method using the well-known roll-form technique, in which posts are formed by rolling the metal into a generally tube-shaped configuration and welding the edges together.

Figure 2:
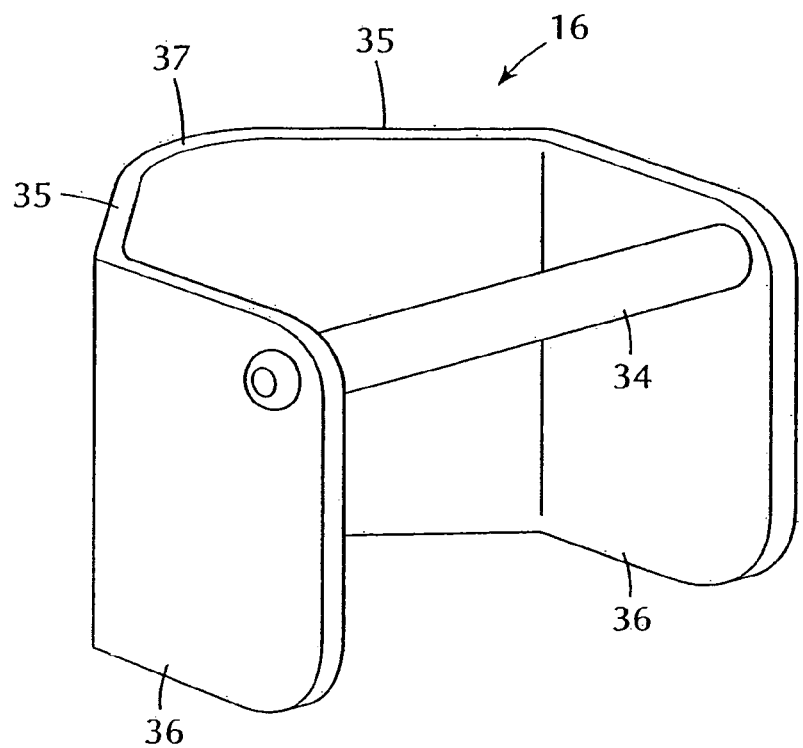
FIG. 2 is a perspective view of a collar in accordance with an exemplary embodiment of the prior art METROMAX-Q system.
Figures 2, 11A:
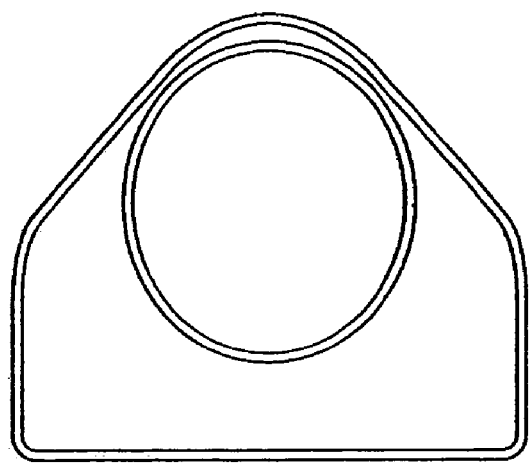
Figures 1, 11A:
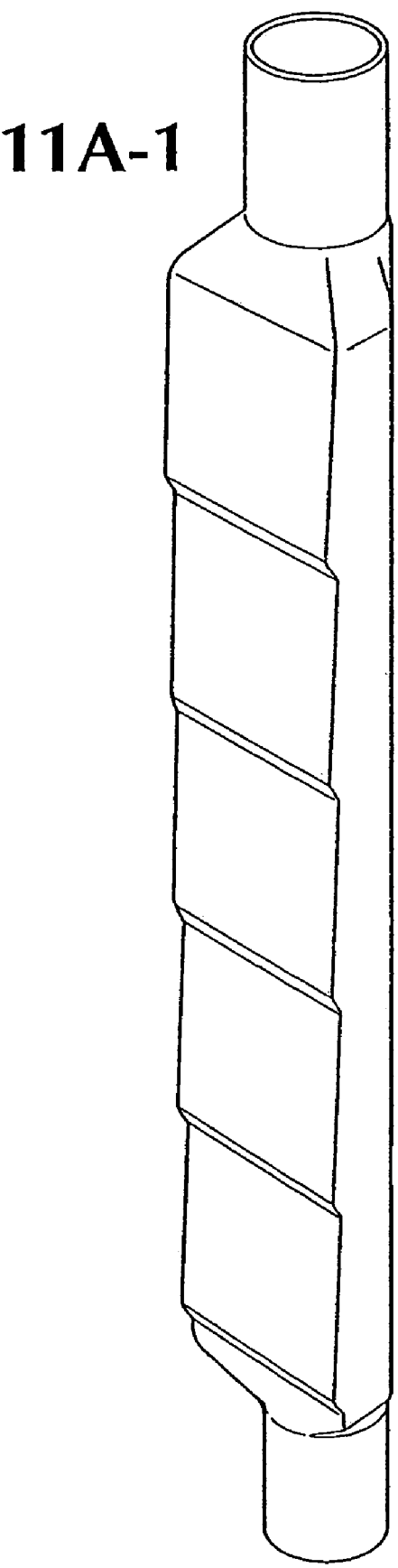

The support posts in accordance with the first aspect of the present invention also may be manufactured by other methods. FIG. 11A-1 illustrates a support post in accordance with the first embodiment of the first aspect of the present invention made by the well-known hydro-forminging manufacturing method is similar to blow molding in which the material from which the post is formed is expanded outwardly under pressure into the contour of a mold cavity in the shape of the final post. In all other respects, such a support post would work as described above. FIG. 11A-2 is a top plan view of such a hydro-formed support post.

As in the other embodiments of the first aspect, a fitting sleeve may be used to reduce friction between the collar and post when the location of a shelf is to be adjusted. The sleeve for any of these embodiments will be substantially the same as the fitting sleeve shown in FIG. 10.

Figures 1, 11B:
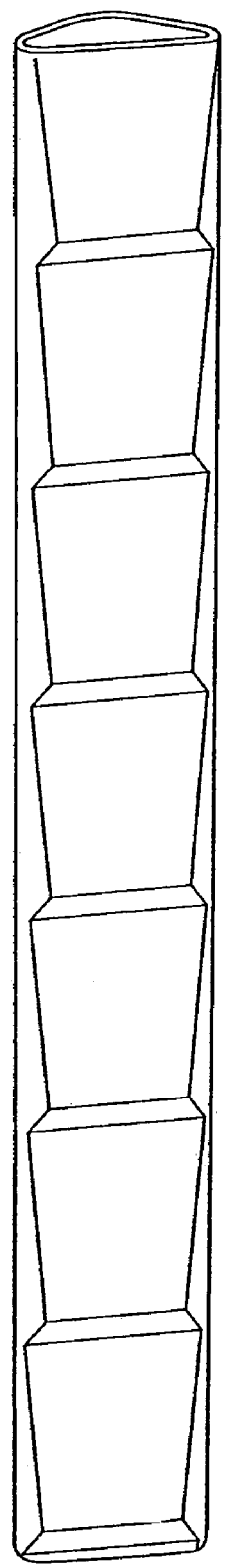
Figures 2, 11B:
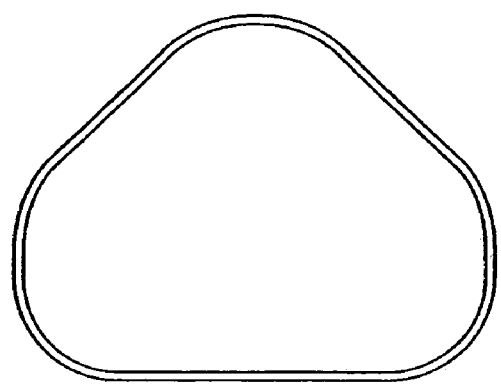

In addition to the above two techniques for making the support post in accordance with the first aspect of the present invention, the post also can be formed by use of a pultrusion process. In the pultrusion process, a set of fibers are pulled through a resin bath and then through a heated die giving the profile its shape. After the die the profile is cooled by air or water and cut into desired lengths. An exemplary support post in accordance with the first aspect and manufactured using the pultrusion die process is shown in FIG. 11B-1. FIG. 11B-2 is a plan view of such a support post. The post is pultruded and then the tapered portions are cut into the post. In all other respects, this post would function the same as the other posts discussed above with reference to the first aspect of the present invention. Also, as in the other embodiments, a sleeve may be used to reduce friction between the collar and post to facilitate shelf adjustment.

FIGS. 11C-1 and 11C-2 are perspective and plan views, respectively, of a support post according to the first aspect of the present invention formed by the hydro-forming process. In all significant respects, such a post operates exactly like the post shown in FIGS. 8A and 8B. As in the other embodiments, a sleeve may be used to reduce the friction between the collar and post to aid shelf adjustment.

Figures 2, 11D:
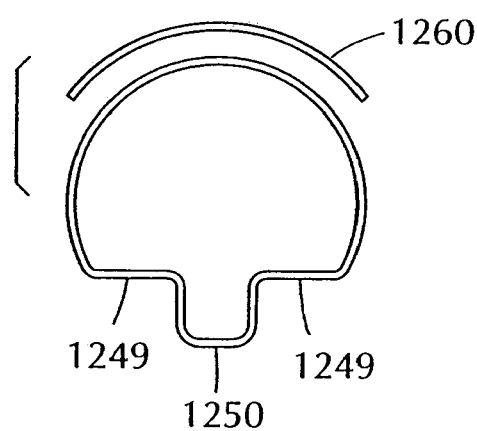
Figures 1, 11D:
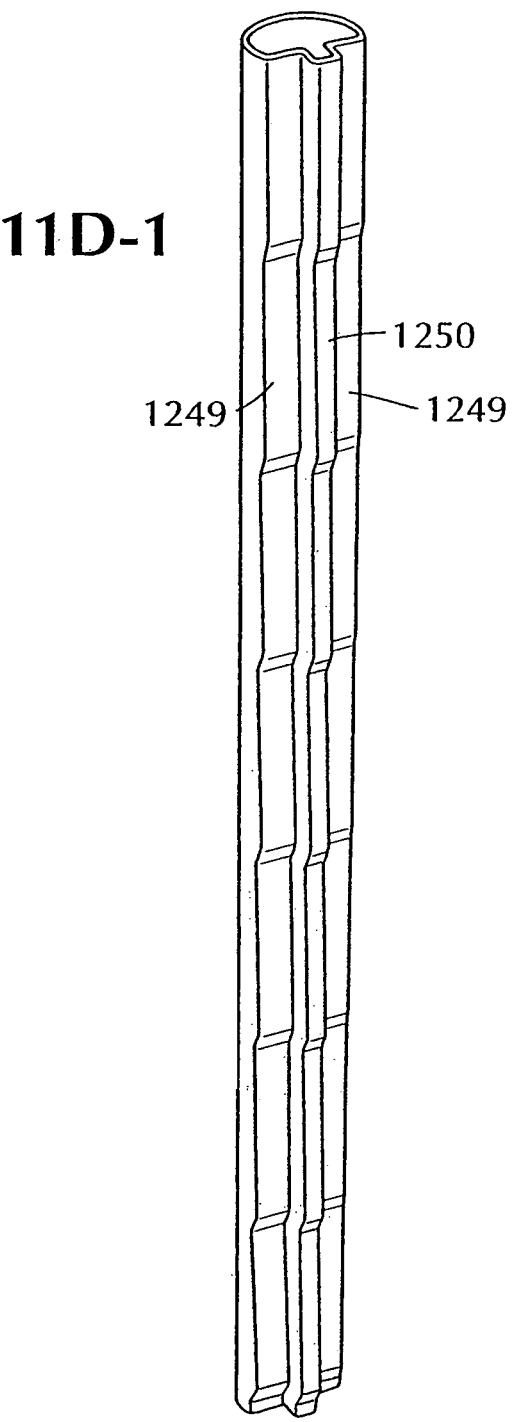

A variation of the support post in accordance with the first aspect of the present invention is shown in FIGS. 11D-1 and 11D-2. As shown in FIG. 11D-1, in this variation, instead of the tapered faces being flat in the horizontal direction, as in the previously described embodiments, each tapered face has a lower tapered portion 1249, and a central, vertically-oriented raised upper tapered portion 1250. By virtue of the shape of the post, a locking mechanism having a flat rear face, such as those described above, would only abut and compress the surface of the raised upper portion 1250. Moreover, it is preferred to utilize a flipper having an indent to correspond to the raised upper tapered portion to insure contact across the width of the post. As seen in FIG. 11D-2, it is preferable in this variation to use a collar sleeve 1260 to reduce friction with respect to the collar (not shown) during shelf adjustment. This variation has an advantage in that is can be used with other shelf support systems, such as the SUPER ERECTA SHELF with only a retrofit sleeve.

FIGS. 11E-1 AND 11E-2 are perspective and plan views respectively of the variation illustrated in FIGS. 11D-1 AND 11D-2, respectively, except formed by the hydro-forming manufacturing process. In all other respects, the post would function the same way as the variation illustrated in FIGS. 11D-1 AND 11D-2.

In accordance with a second aspect of the present invention, the inclined plane is provided by means of a distinct wedge member that is secured by a collar and flipper that provides, in the locked position, a compression force to force the wedge member against an interior face of the support post. In the second aspect, and in each disclosed embodiment thereof, the flipper is mounted on the collar to rotate about a longitudinal axis of a shaft formed in the collar. The flipper is movable between an unlocked position and a locked position. When the flipper is in the locked position, the rear face of the flipper directs an inward radial compression force against the wedge member. The wedge member is tapered to be thicker at the lower end thereof. This tapered shape creates an inwardly directed force by the weight of the shelf assembly to provide a wedging action between the corner support assembly and the wedge member.

The wedge member in accordance with the second aspect and the embodiments thereof advantageously includes structure forming a securing portion that ensures that the wedge member is trapped within the corner support assembly and will not slip out of the corner support assembly when the corner support assembly is in an unlocked position, for example during adjustment, assembly or disassembly of shelves using the corner support assembly.

Figure 12B:
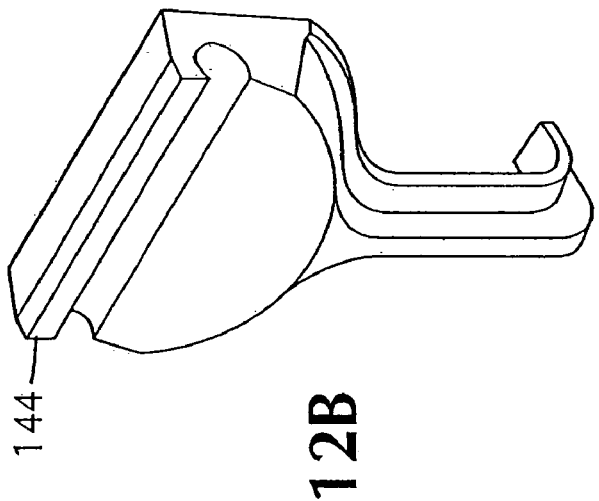
FIGS. 12A, 12B and 12C are perspective views of a collar, wedge member and flipper, respectively, in accordance with a first embodiment of a second aspect of the present invention.
Figure 12C:
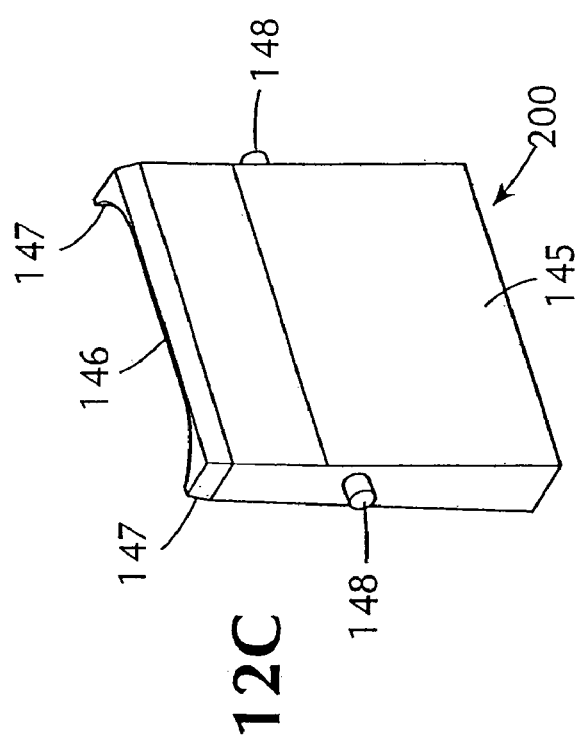
Figure 12A:
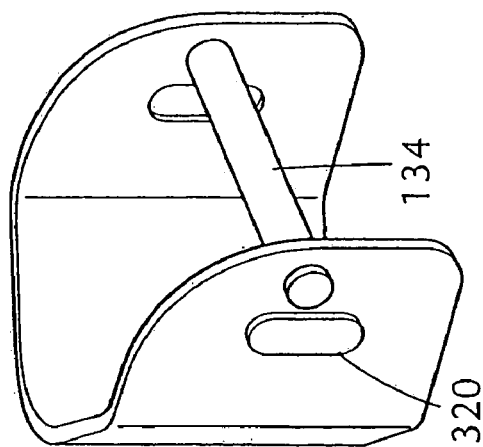

FIGS. 12A, 12B and 12C illustrate a collar, wedge member, and flipper in accordance with a first embodiment of the second aspect of the present invention. FIG. 12B illustrates a wedge member 200 designed to clip onto an interior face of the support post 128. The wedge member includes a front portion 145 flanked by two contoured lips 147. In addition, although not visible in this view, detent means such as internal beads, or ribs, are provided on the internal surface of the wedge member and are spaced at intervals corresponding to spacing of grooves on the support post 128 just as in the wedge member of the METROMAX-Q system, shown in FIG. 4. In the first embodiment of the second aspect, the support post 128 is of the same or substantially similar structure to that of the METROMAX-Q system, having a substantially flat inner surface with horizontal grooves spaced apart vertically, as is visible in FIG. 1. FIG. 12C illustrates a flipper in accordance with this embodiment. As in the first aspect, the flipper has an upper end and a lower end. The upper end has a flat portion and rounded portion, with the rounded portion defining part of an open cylindrical cavity for receiving the shaft 134 of the collar.

In the first embodiment in accordance with the second aspect, internal beads, not visible in the figure, are provided on the wedge member 200 to mate with the configuration of the grooves in the support post. As in the METROMAX-Q system, the number, size and shape of the internal beads may be varied for a number of reasons including, for example, the size of the wedge member, the size of the spacing of the grooves in the support posts, and the shelving application. The internal beads provide vertical support when they are seated in the grooves of a support post. To further secure the wedge member on the support posts, additional vertical support is provided by a wedge action as discussed below. It will therefore be appreciated that the wedge member 200 may be located on to the support posts at any incremented height, and further may be translated up and down to any other incremented height.

An advantageous feature of the wedge member 200 in accordance with this embodiment is the presence of two molded in studs 148, one at each lateral side of the wedge. Alternatively, instead of being molded in, the studs can be made of a material different from the wedge member, such as metal, installed securely in the wedge member in any known manner. As shown in FIG. 12A, the collar in the first embodiment of the second aspect is substantially the same as in the first aspect of the present invention, except for the presence of collar channels 320 on each lateral face of the collar. When the corner support is assembled, the studs 148 are positioned within the collar channels 320 allowing the wedge member 200 to move vertically with respect to the collar, but constrained by the presence of the studs within the channels.

Figure 13B:
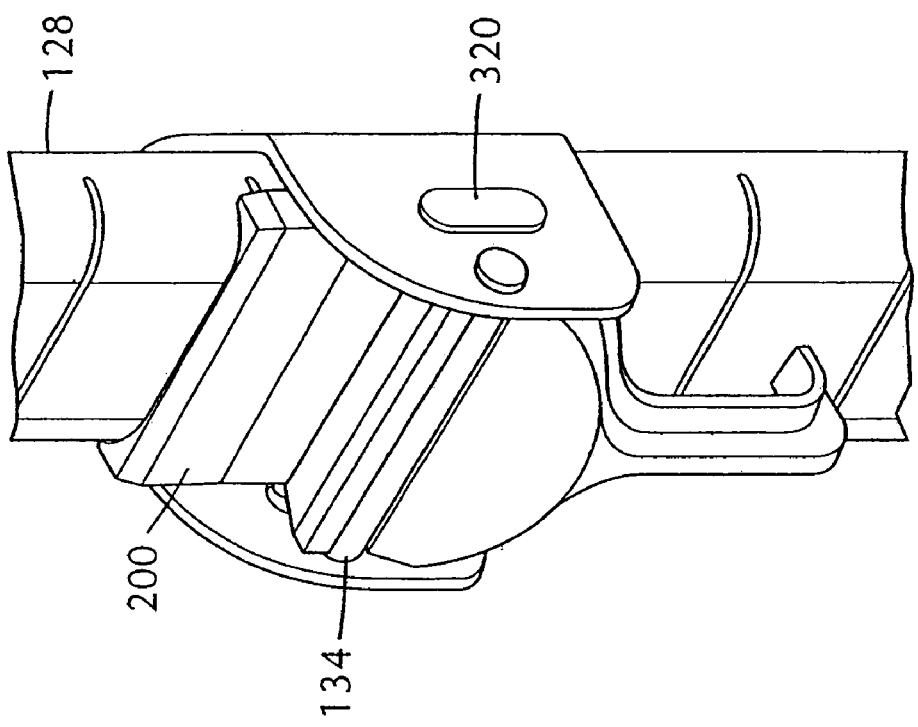
FIGS. 13A and 13B are partial perspective views of the support assembly in accordance with the first embodiment of the second aspect of the present invention in the unlocked and locked positions, respectively.
Figure 13A:
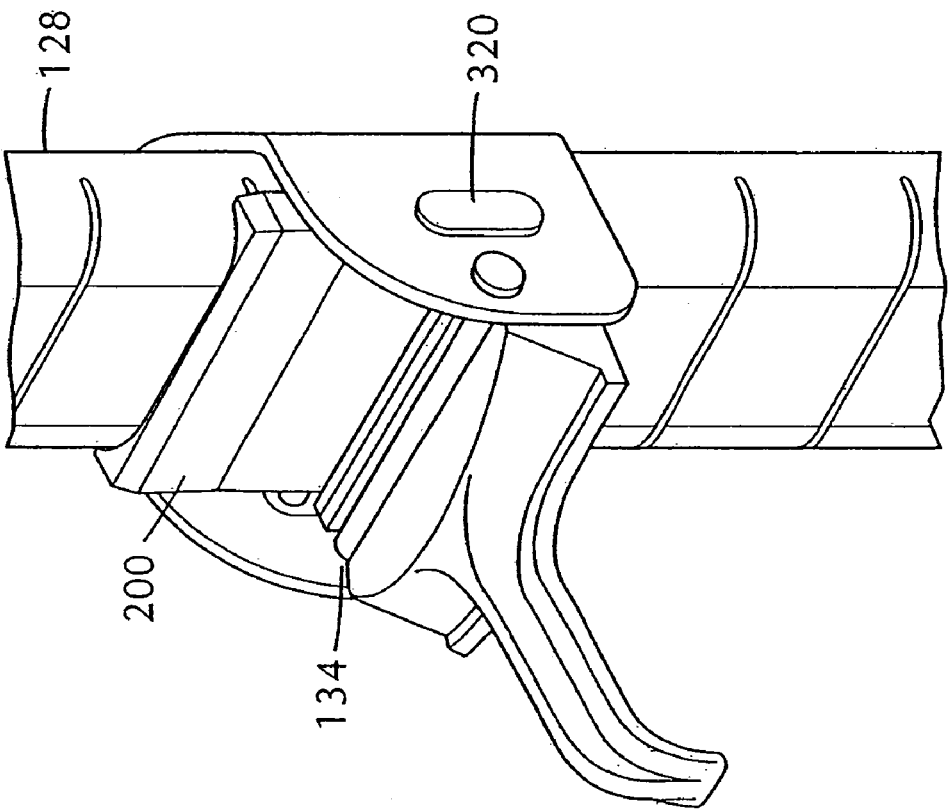

As shown in FIG. 13A, in the unlocked position, the flipper is raised and the studs are positioned securely within the channels 320. When the flipper is lowered to the locked position applying a radial compression force to the wedge member, as shown in FIG. 13B, the collar may move vertically somewhat relative to the wedge member and/or post during the locking process, but such relative movement is constrained by the capture of the studs in the channels. The capture of the wedge member as described above advantageously prevents the wedge member from coming loose of the overall corner support assembly.

Figure 14C:
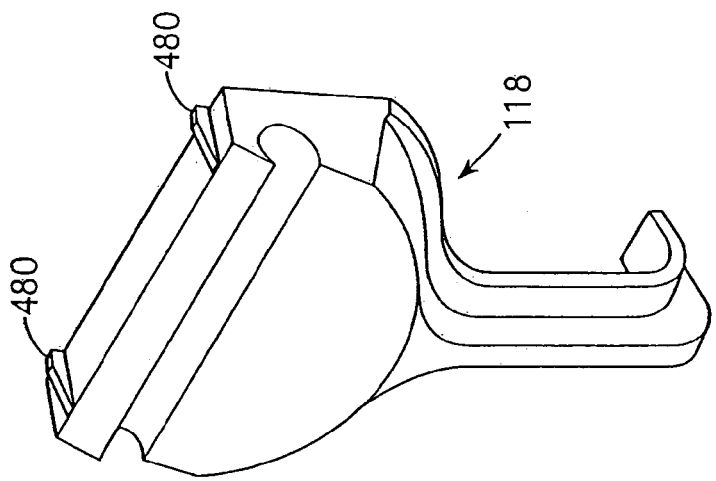
FIGS. 14A, 14B and 14C are perspective views of a collar, wedge member, and flipper, respectively, in accordance with a second embodiment of the second aspect of the present invention.
Figure 14B:
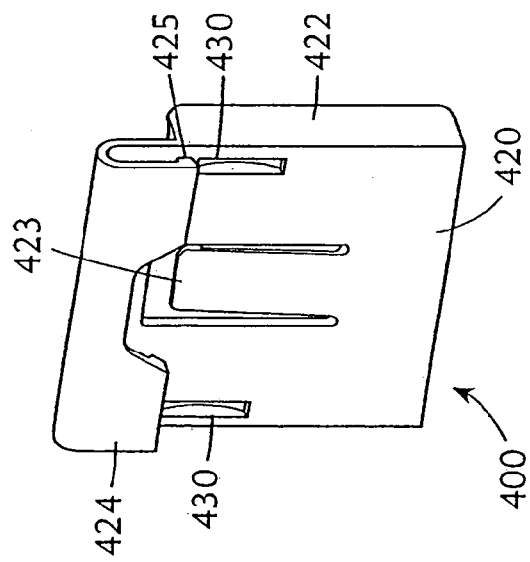
Figure 14A:
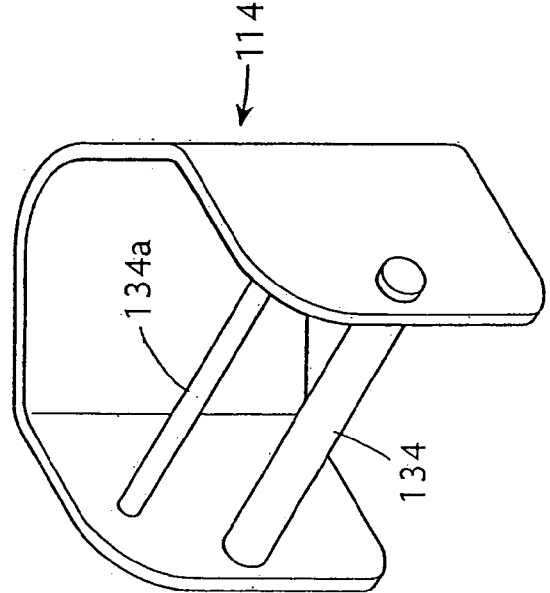

FIGS. 14A, 14B and 14C illustrate a collar, wedge member and flipper, respectively, for a corner support system in accordance with a second embodiment of the second aspect of the present invention. In this embodiment, as best shown in FIG. 14B, a wedge member 400 is provided that has a molded in spring 423 and guide slots 430. The wedge member 400 has a front portion 420 flanked by two contoured lips 422. The top of the wedge member includes an overhanging support lip 424.

As can be seen in FIG. 14A, in this embodiment, the collar has shaft 134 that functions as in the other embodiments to allow the open cylindrical cavity of the flipper 118 to rotate thereabout. In the present embodiment, the collar has an additional wedge support pin 134a. Upon assembly of the corner support assembly in accordance with this embodiment, the overhanging support lip 424 of the wedge member 400 is positioned so as to overhang the wedge support pin 134a. The lip 424 also has an inwardly projecting detent 425 for capturing the pin 134A.

Guide slots 430 are provided on the wedge member 400 to mate with guide portions 480 on the flipper 118, best shown in FIG. 14C. As can be seen in FIGS. 15A and 15B, when the flipper is moved from the unlocked to the locked position, the flipper guide portions 480 move radially within to engage the corresponding guide slots 430, and the front face of the flipper exerts a radial compression force against the molded in spring 423 and the wedge member in general. As in the other embodiments, the wedge member is tapered to provide an inwardly directed wedging force when the weight of the shelves is applied thereto.

Figure 16C:
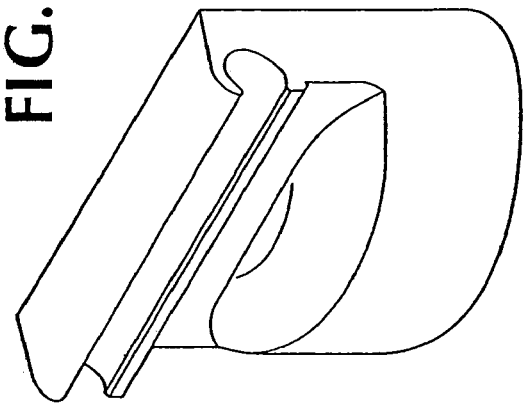
FIGS. 16A, 16B and 16C are perspective views of a collar, wedge member, and flipper, respectively, in accordance with a third embodiment of the second aspect of the present invention.
Figure 16B:
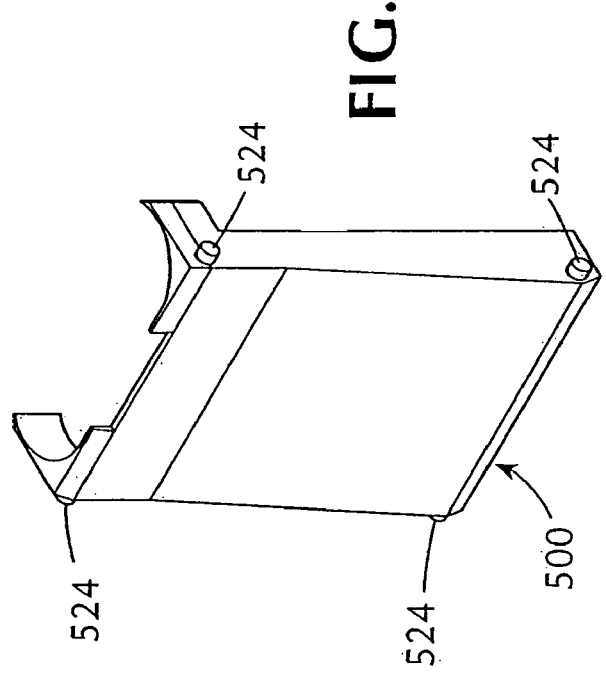
Figure 16A:
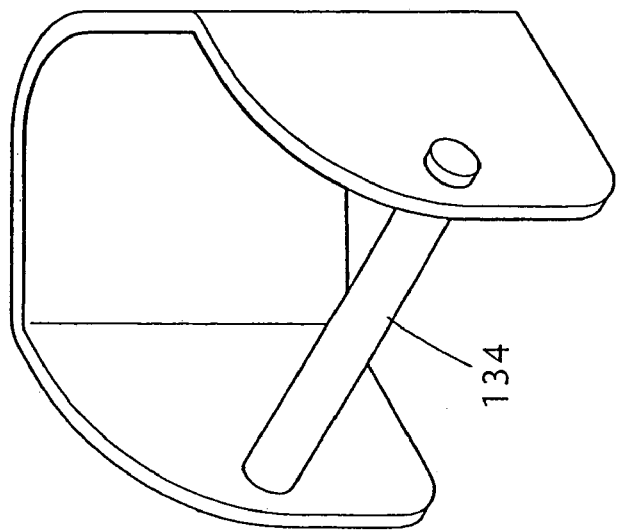
Figure 17A:
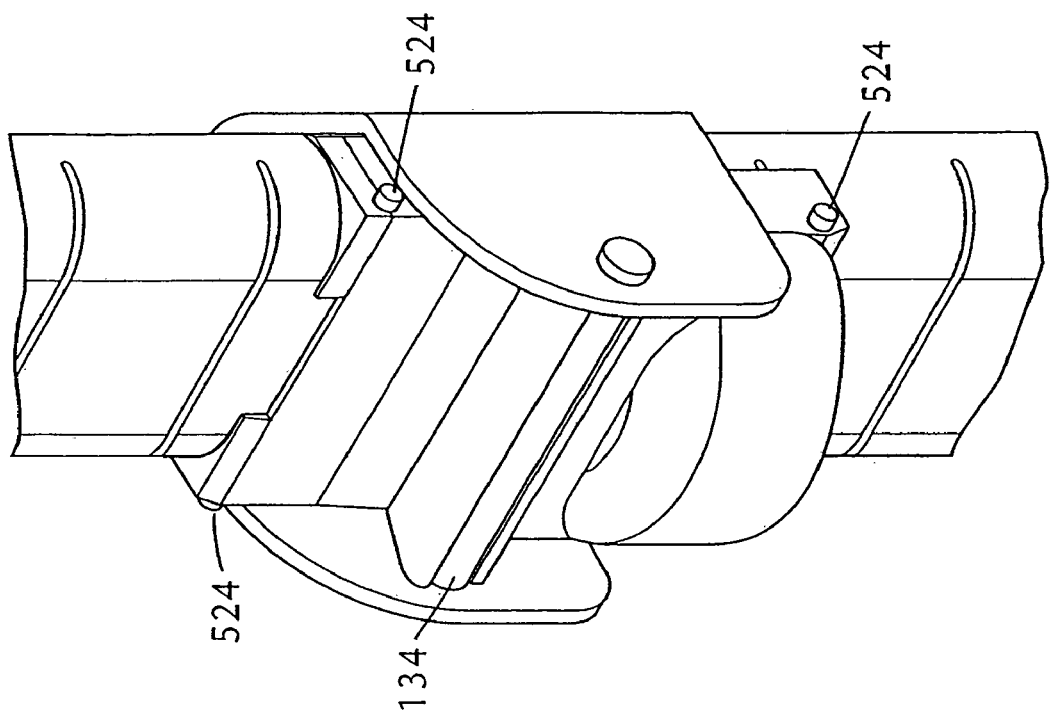
FIGS. 17A and 17B are partial perspective views of the support assembly in accordance with the third embodiment of the second aspect of the present invention, in the unlocked and locked positions, respectively.
Figure 17B:
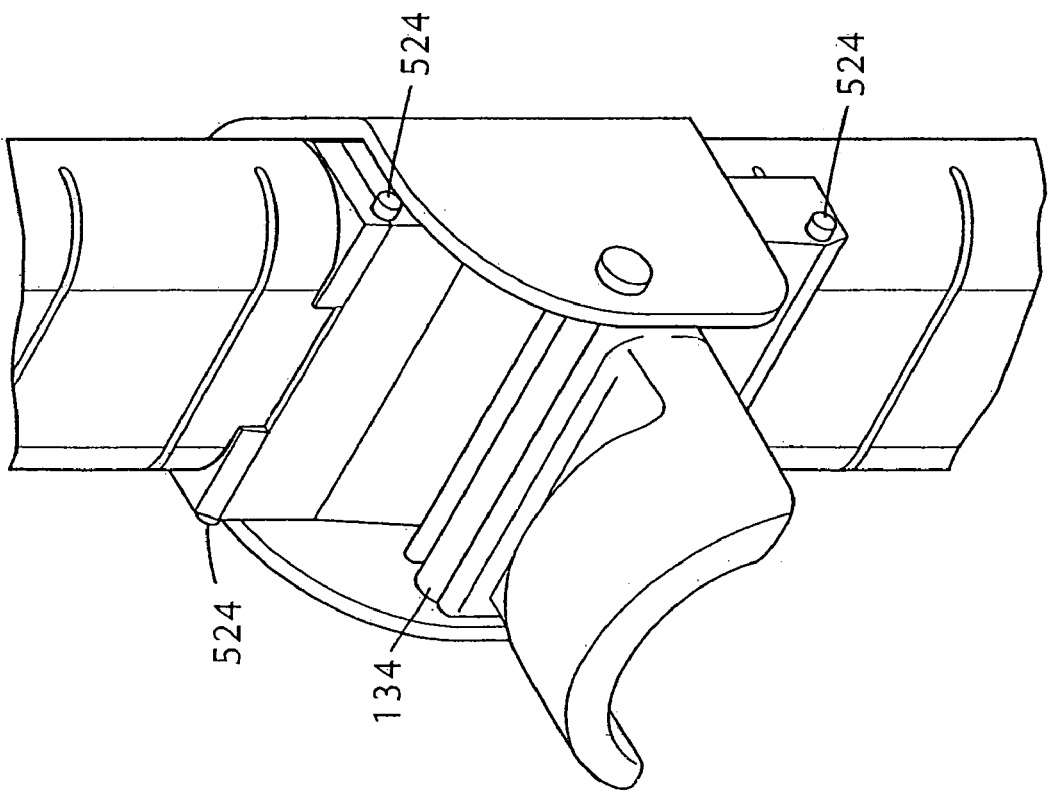

FIGS. 16A, 16B and 16C illustrate a collar, wedge member, and flipper in accordance with a third embodiment of the second aspect. As can be seen in FIG. 16B, the wedge member 500 is provided with molded in studs 524 at the top and bottom of lateral sides thereof. Alternatively, the studs may comprise other materials, such as metal studs, screws or rivets, embedded securely within the lateral sides of the wedge member. The wedge member in accordance with this embodiment is designed to work with the standard METROMAX-Q collar and flipper, shown in FIGS. 16A and 16C, respectively, which will not be described further. However, the studs 524 provide the wedge member 500 in accordance with the present embodiment an advantage over the prior art wedge member in that they allow the wedge member to follow the collar during, for example, height adjustment of shelves, because the wedge is trapped within the support assembly by the positioning of studs above and below the collar. This positioning prevents the wedge from slipping out of the corner support assembly during vertical adjustment of the support assembly. As can be seen in FIGS. 17A and 17B, the studs in use are positioned so as to rest above and below the collar to prevent the wedge from slipping above or below the level of the collar, especially in the unlocked position in which the wedge member may become loose. In all other ways, the wedge member, collar and flipper in this modification operate substantially as in the METROMAX-Q system discussed above.

Figure 18B:
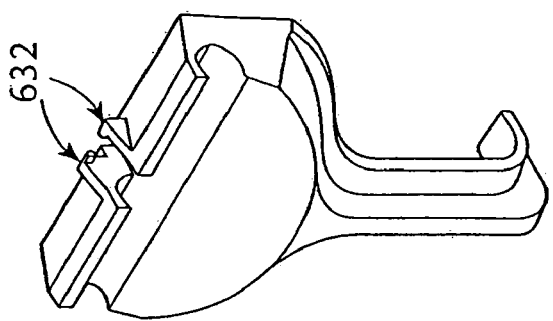
FIGS. 18A, 18B and 18C are perspective views of a collar, wedge member and flipper in accordance with a fourth embodiment of the second aspect of the present invention.
Figure 18C:
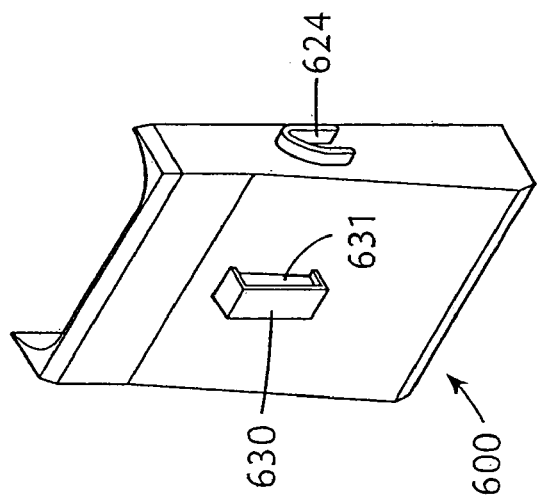
Figure 18A:
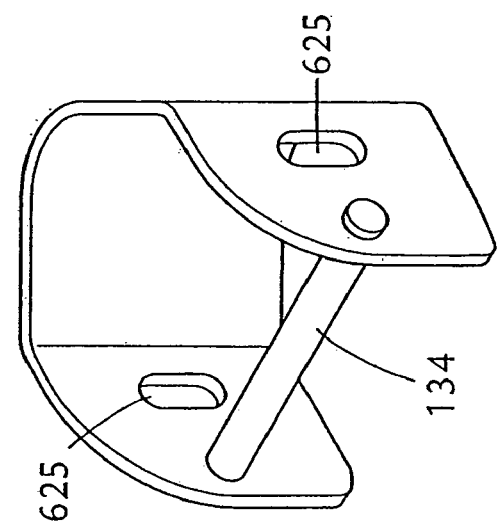

FIGS. 18A, 18B and 18C illustrate a collar, wedge member, and flipper in accordance with a fourth embodiment of the second aspect. As shown in FIG. 18B, the wedge member 600 in accordance with this embodiment is generally of the same shape as the wedge member shown in FIG. 16B, except that it has molded in leaf springs 624 on lateral sides thereof, and a camming structure 630 protruding from the front face of the wedge member. As shown in FIG. 18A, the collar in this embodiment is provided with spring receiving slots 625 having a width narrower than that of the corresponding leaf springs 624 on the wedge member.

Figure 19B:
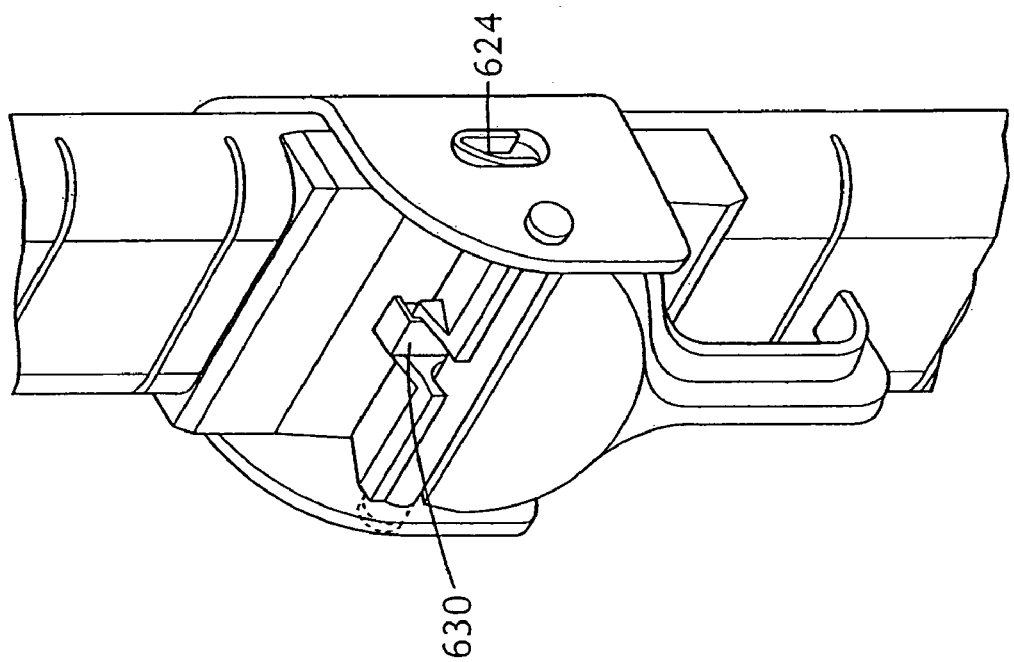
FIGS. 19A and 19B are partial perspective views of the support assembly in accordance with the fourth embodiment of the second aspect of the present invention, in the unlocked and locked positions, respectively.
Figure 19A:
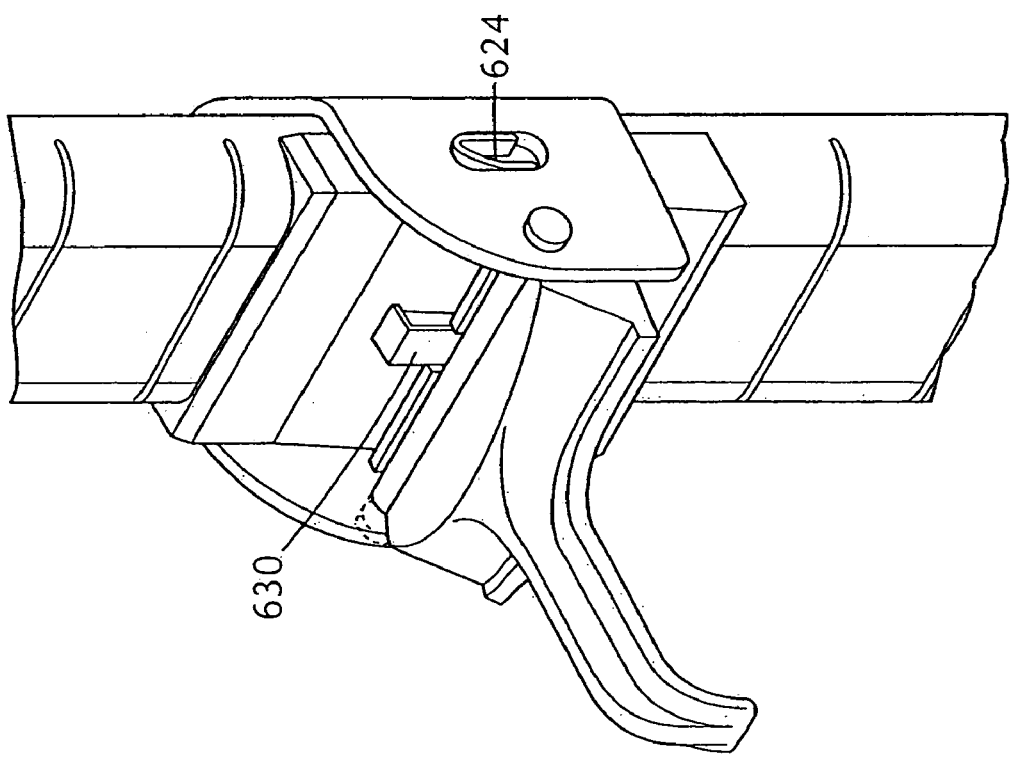

As shown in FIG. 18C, the flipper is substantially the same as in previous embodiments except for the presence of two molded in fingers 632 at the center of a top edge of the flipper. The fingers 632 are configured to face one another with a gap therebetween sufficiently large to be accommodated by and move reciprocatingly within inner channel portions 631 of the camming structure 630, upon assembly of the corner support. As shown in FIGS. 19A and 19B, in the assembled corner support in accordance with this embodiment, the lateral leaf springs 624 are seated in the spring receiving slots 625 and being seated therein function generally to keep the wedge connected to the collar. The leaf springs 624 are under tension only when the flipper is in the unlocked position. As seen in FIG. 19A, in such position, the leaf springs exert a force against the inner edge of each spring receiving slot 625 in reaction to a force exerted by the flipper tending to pull the wedge member 600 away from the post. The flipper pulls the wedge member 600 away from the face of the support post when the flipper is in the unlocked position because the movement of the flipper to the unlocked position causes the fingers 632 to move downwardly, toward the shallower lower ends of the inner channel portions 631 of the camming structure 630. Because the lower ends of the channels are shallower, the downward movement of the fingers in the channels creates a force that tends to pry the wedge member 600 away from the support post. However, this motion also places the leaf springs under tension, in which they exert a force to oppose that created by the prying of the flipper.

The spring receiving slots 625 of the collar are narrower than the leaf springs 624. When the flipper is moved to the locked position, a radial compression force is applied to the wedge member 600 that causes the front face of the wedge member 600 to press securely against the inner face of the support post, and the leaf springs are no longer in tension. In addition to biasing the wedge towards the support post, a clicking sound is produced as the beads pass over the grooves, allowing the user to know that a bead is properly aligned with a groove.

Figure 20C:
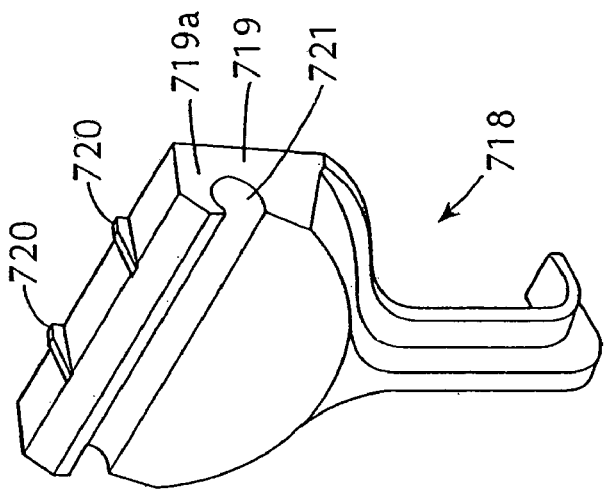
FIGS. 20A, 20B and 20C are perspective views of a collar, wedge member, and flipper, respectively, in accordance with a fifth embodiment of the second aspect of the present invention.
Figure 20B:
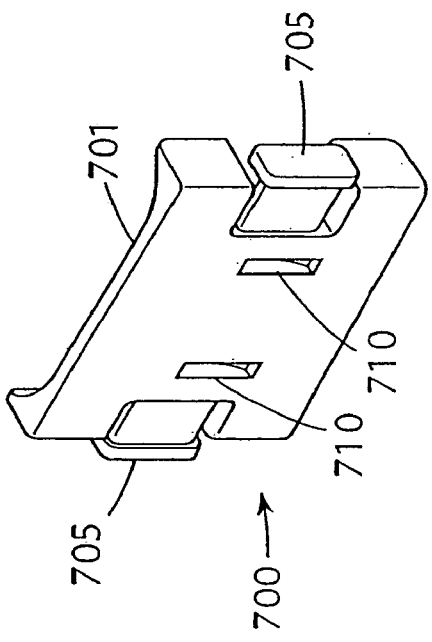
Figure 20A:
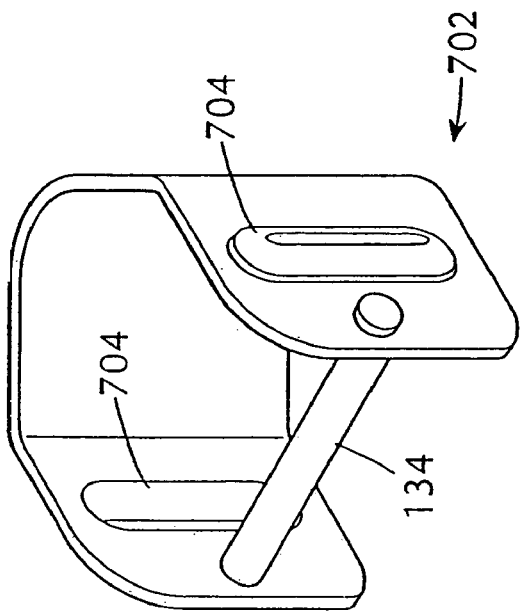

FIGS. 20A, 20B and 20C illustrate a collar, wedge member, and flipper in accordance with a fifth embodiment of the second aspect of the present invention. As shown in FIG. 20B, a wedge member 700 has molded in springs 705 on lateral sides of the wedge member. The collar 702, shown in FIG. 20A, has embossed channels 704 on lateral sides thereof to receive and slidably engage the springs 705 when the corner support is assembled, but is in other respects similar to the METROMAX-Q collar. The wedge member 700 also has grooves 710 adapted to accept corresponding molded portions 730 formed in the top of the flipper 718, as best seen in FIG. 20C. The flipper 718 has a handle and an upper end. The upper end has a flat portion 719 and a rounded portion 719a, with the rounded portion defining part of an open cylindrical cavity 721 for receiving and containing the shaft 134 of the collar 702.

Figure 21B:
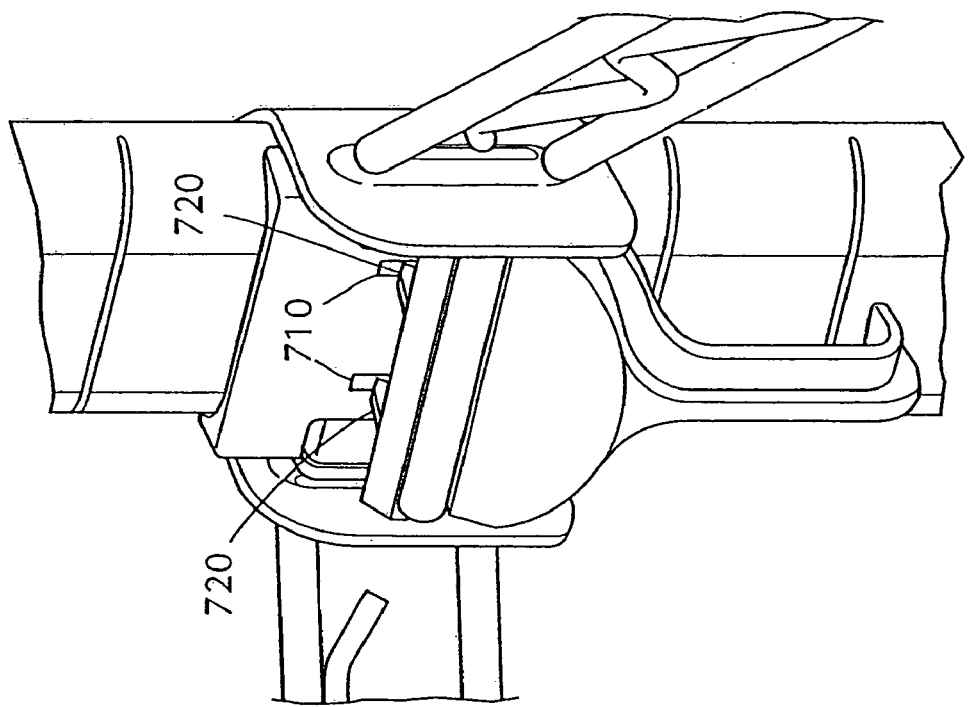
FIGS. 21A and 21B are partial perspective views of the support assembly in accordance with the fifth embodiment of the second aspect of the second aspect of the present invention, in the unlocked and locked positions, respectively.
Figure 21A:
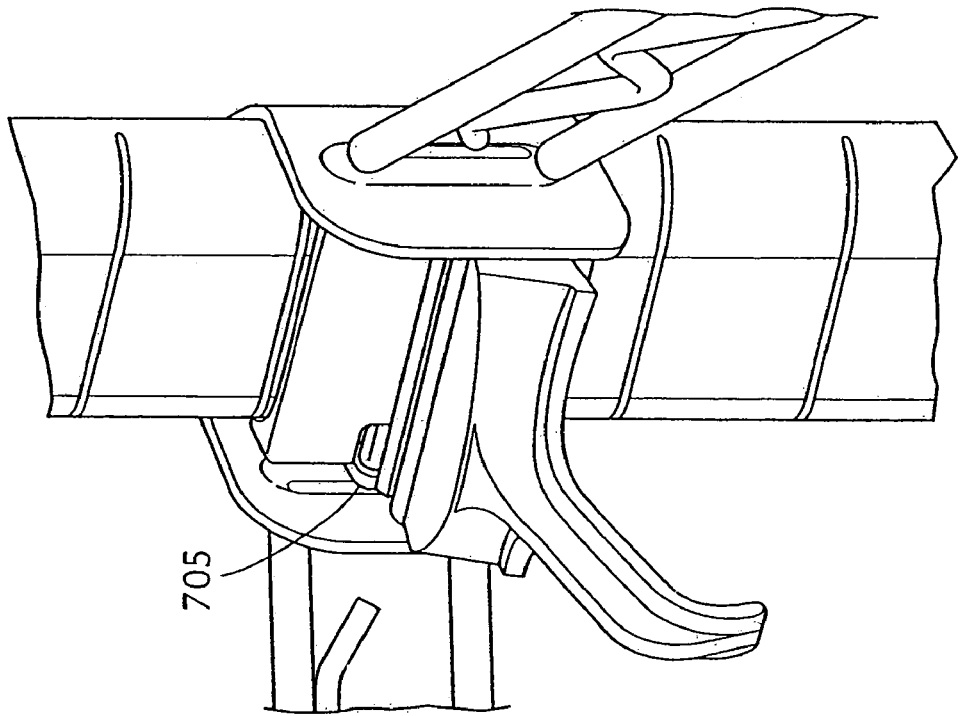

As can be seen in FIGS. 21A and 21B, in the assembled corner support, the flipper is mounted on the collar to rotate about a longitudinal axis of the shaft. When the flipper 718 moves from the unlocked to the locked position, the molded portions 720 of the flipper rotate within the grooves 700 and the flipper exerts an inwardly-directed compression force to press the wedge member securely against the support post, while at the same time placing the springs under tension. As can be seen in the figures, moving the flipper to the locking position also may cause the wedge member to move upwardly, but the movement is constrained by the presence of the ends of the captured springs within the channels. The presence of the ends of the springs within the channels also tends urge the main body of the wedge member 700 away from the support post when the flipper is in the unlocked position, the tension of the springs being at least partially relieved when the compression force exerted by the flipper is removed.

The present invention in accordance with a third aspect includes the inclined plane functionality in a system using support posts of the type used in the METROMAX-Q system, but without the need for a distinct wedge member. This is accomplished by forming the inclined plane structure in the flipper or in the collar.

Figure 22B:
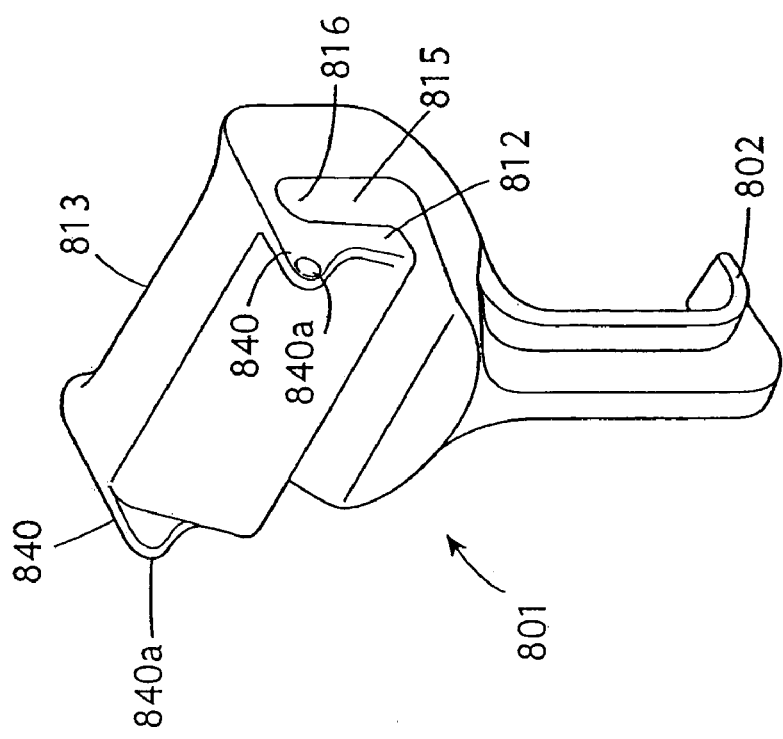
FIGS. 22A and 22B are perspective views of a collar and flipper, respectively, in accordance with a first embodiment of a third aspect of the present invention.
Figure 22A:
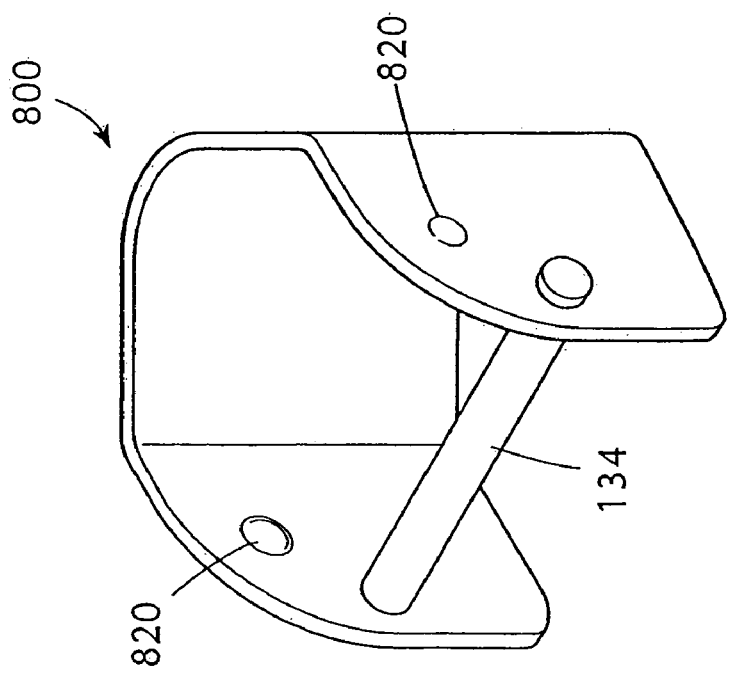

According to a first embodiment of the third aspect of the present invention, the wedge member is integrally formed into the structure of the flipper. FIGS. 22A and 22B illustrate a collar 800 and flipper 801, respectively, in accordance with this embodiment. As best seen in FIG. 22A, the collar 800 has bumps 820 formed in lateral sides thereof, but is otherwise similar to the METROMAX-Q collar described above, having a cylindrical shaft 134 extending between lateral sides of the collar. The bumps 820 function to mate with corresponding recesses, or detents, on the flipper 801. As seen in FIG. 22B, the flipper 801 has a front face 813 that conforms to the shape of the inner face of the support post. The flipper 801 also has an overhanging lip 812 having ears 840 protruding therefrom. The ears have recesses 840a molded therein. A channel 815 is defined by the inner side of the lip 812 and an inner wedging surface 816. The inner wedging surface 816 is tapered preferably at an angle about a four degrees from vertical.

Figure 23B:
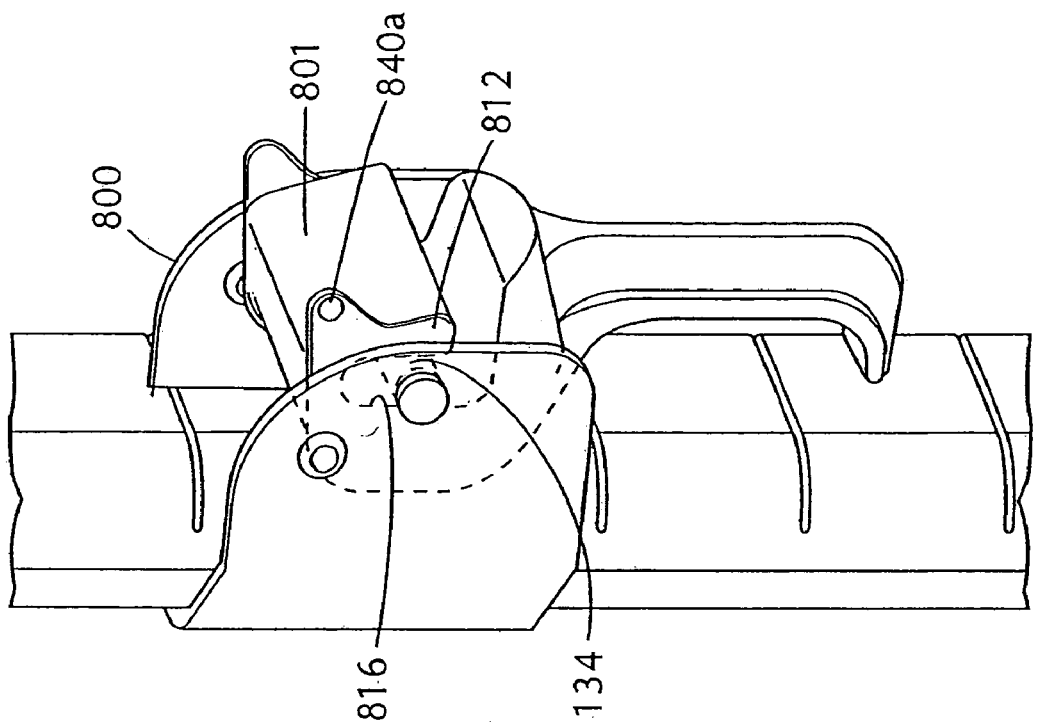
FIGS. 23A and 23B are partial perspective views of a support assembly in accordance with the first embodiment of the third aspect of the present invention, in the unlocked and locked positions, respectively.
Figure 23A:
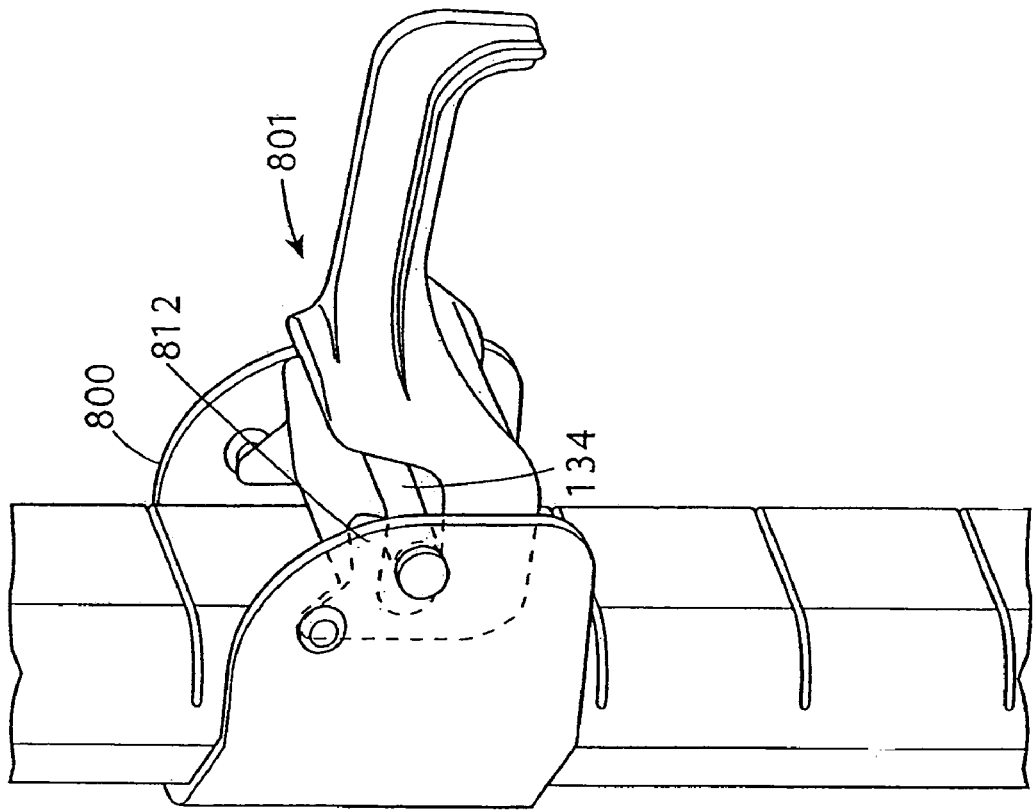
Figure 25B:
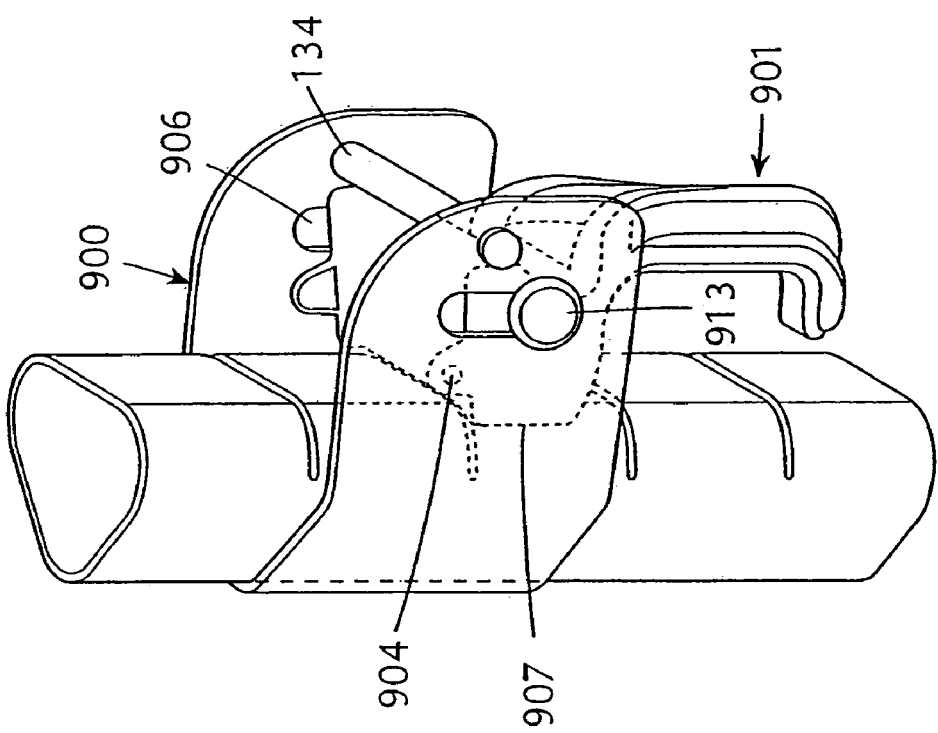
FIGS. 25A and 25B are partial perspective views of a support assembly in accordance with the second embodiment of the third aspect of the present invention, in the unlocked and locked positions, respectively.
Figure 25A:
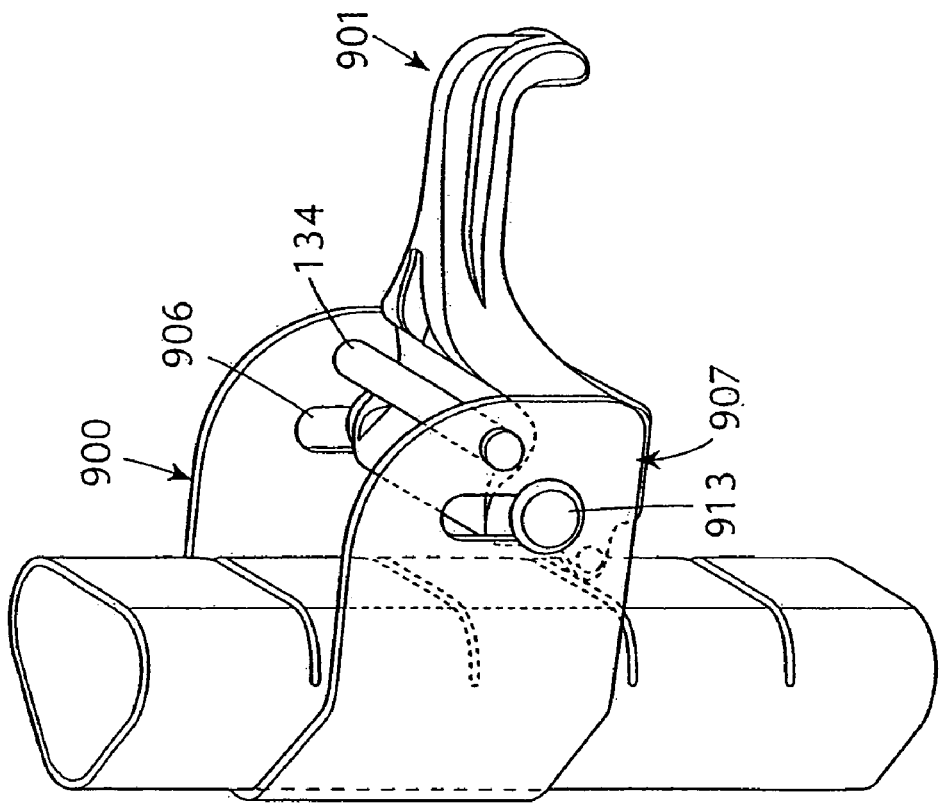

As can be seen in FIGS. 23A and 23B, when the corner support is assembled, the shaft 134 is positioned within the channel 815 to allow the flipper to rotate about a longitudinal axis of the shaft 134. In the unlocked position, the flipper 801 is held in the open position by the bumps 820 on the collar being seated in the recesses 840A of the flipper 801. To place the corner support structure into the locked position, the flipper 801 is moved downwardly, which forces the flipper to rotate around the shaft 134, causing the front face 813 of the flipper to be urged against the inner face of the support post by a compression force, caused by the fact that the thickness of the flipper is greater between the inner wedging surface 816 and the front face 813 than between the top of the channel 815 and the top of the flipper 801. Because of this difference, a radial compression force is created when the thicker portion of the flipper is wedged within the space between the shaft 134 and the front face of the post, which occurs whenever the flipper is moved to the locked position, as can be seen in FIGS. 23A and 23B. Further, due to the tapered shape of the inner wedging surface 816, in the locked position, an inwardly directed wedging force is created between the collar and the portion of the flipper having the tapered face, because of the weight of the shelf assembly. That is, the weight of the shelf assembly tends to push the collar down, causing the shaft 134 to press down on the inner wedging surface 816, the downwardly directed force being translated to an inwardly directed force by the tapered surface of the inner wedging surface 816. Thus, a portion of the flipper structure in this embodiment performs the function performed in other embodiments by the wedge member.

FIGS. 24A, 24B and 24C illustrate a collar 900, a flipper 901 and a support pin 902, respectively, in accordance with a second embodiment of the third aspect. As best seen in FIG. 24A, the collar 900 has a cylindrical shaft 134 and bumps 908. The collar also has channels 906 that run generally vertically in the lateral sides of the collar but are angled or inclined upwardly inwardly toward the back of the collar. As best seen in FIG. 24C, the flipper 901 in accordance with this aspect has an extended handle 910 for ease of locking and unlocking. The flipper 901 has a front surface 907 that is curved so as to mate with, in the locked position, the curved inner face of the support post. The flipper 901 is integrally molded so as to provide a trough 905, in which will rest, when the corner support is in the unlocked position in the assembled state, the cylindrical shaft 134. The flipper 901 also includes recesses 904 in ears 903.

The upper portion of the flipper has a cylindrical cavity 909 extending therethrough. A flipper pin 902 is, in the assembled state, installed in the cylindrical cavity. The pin 902 may be made of two parts 902a and 902b and have end caps 913. To assemble the corner support in accordance with the present embodiment, the flipper 901 is positioned such that the cylindrical shaft 134 of the collar 900 rests in the trough 905. Each part of the flipper pin then is inserted through the respective channels 906 and secured together with the flipper's cylindrical cavity. The end caps 913 thus rest outside the collar trapping the flipper and collar together. As can be seen most clearly in FIGS. 25A and 25B, in the unlocked position, the cylindrical shaft 134 is positioned within the trough 905, and the recesses 904 are held by bumps 908, which tend to keep the flipper in the unlocked position. Upon rotating the flipper downwardly to the locked position, the front surface 902 of the flipper comes into contact with the support and the flipper imparts a compression force that secures the front surface to the support post. The compression force occurs because the thickness of the top portion of the flipper is greater between the cylindrical cavity and the front face than between the cylindrical cavity and the top of the flipper. Because of this difference, rotation of the flipper into the locked position forces the thicker portion of the flipper between the shaft and the support post, which creates the compression force. In addition, as a shelf secured to the collar 900 is loaded, the collar will move downwardly relative to the flipper. Therefore, interaction of the pin 902 with the upwardly inwardly directed back edges of the channels 906 will also urge the flipper into tight engagement with the post.

Figure 26A:
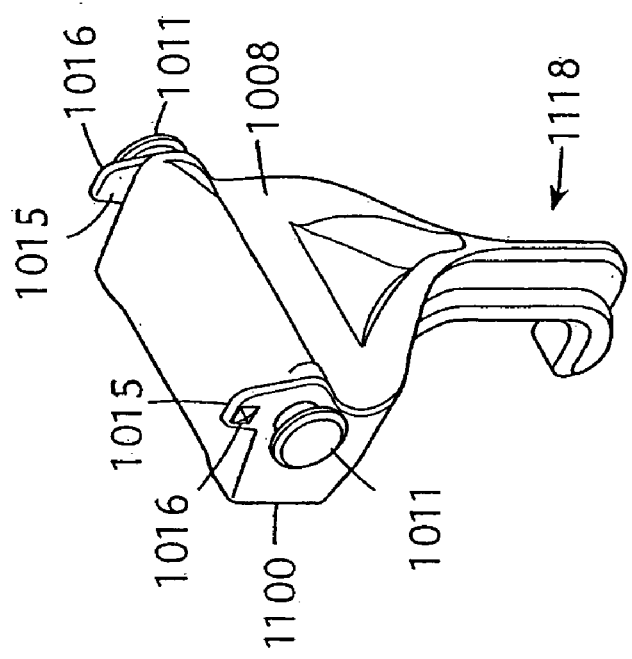
FIGS. 26A and 26B are perspective views of a collar and flipper, respectively, in accordance with a third embodiment of the third aspect of the present invention.
Figure 26B:
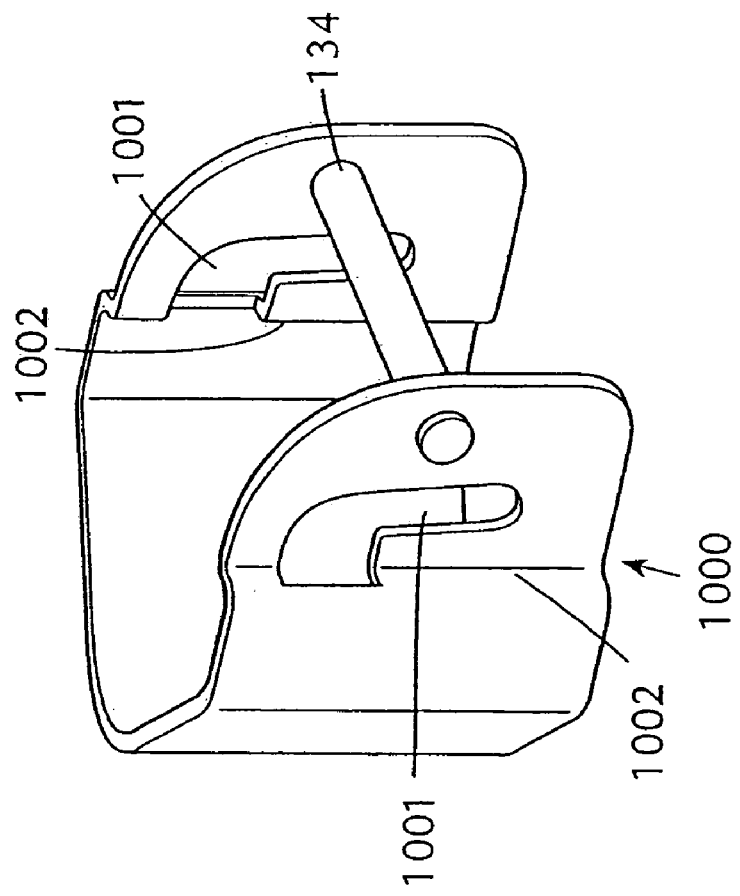

FIGS. 26A and 26B illustrate a collar and flipper in accordance with a third embodiment of the third aspect of the present invention. As best seen in FIG. 26A, the collar 1000 in accordance with this embodiment includes an inward offset 1002 on each lateral side thereof. As will become more clear, the offset allows for easy assembly of the collar and flipper to form the corner support assembly. The collar 1000 also includes L-shaped channels 1001 along each lateral side. Each channel has a shorter horizontally oriented channel portion located at an upper end of the channel, and a longer generally vertically oriented channel portion. The generally vertically oriented channel portions are angled or inclined upwardly inwardly toward the back of the collar. As best seen in FIG. 26B, the flipper 1118 in accordance with the present aspect is similar to the flipper shown in FIG. 24B except that in FIG. 26B the flipper is shown with a pin already installed into a cylindrical cavity not visible in this view. The flipper has end caps 1011 extending from each side of a top portion thereof. The end caps are the ends of the installed pin, as discussed above. The flipper also has ears 1015 each having tabs 1016 and a trough 1008 extending across an upper portion of the flipper. A front face 1100 is shaped so as to mate with an inner surface of the support post.

The offset 1002 and the horizontally oriented portions of the channels 1001 cooperate to enable the collar and flipper to be easily assembled into the corner support. To assemble the corner support, all that is required is to drop the flipper's end caps into the collar and pull the flipper forward, allowing the end caps to enter the L-shaped channels 1001 at the horizontally oriented portions thereof. Because the channels extend through the offset portion, a wider entry passageway is formed for the end caps in the offset portion. Once the flipper is pulled forward and down, into the generally vertically oriented channel portions, the end caps will ride along the outside of the lateral faces of the collar and the flipper will not break apart from the collar unless the assembly process is reversed.

In the unlocked position, shown in FIG. 27A, the horizontal shaft 134 rests in the trough 1008 and the end pins are captured within the channels. Upon application of a downward force to the flipper, the front face of the flipper is rotated so as to be brought into contact with the inner face of the support post. Because the upper portion of the flipper is thicker from back to front, and because the motion of the flipper is constrained by being trapped in the channels, the rotation of the flipper creates a compression force that secures the corner assembly securely to the post, similarly to the previously discussed embodiment. In addition, as a shelf secured to the collar 1000 is loaded, the collar will move downwardly relative to the flipper. Therefore, interaction of the pin with the upwardly inwardly directed back edges of the generally vertically oriented channel portions will also urge the flipper into tight engagement with the post.

While the support system of the present invention has been described above in use with substantially triangular-shaped and D-shaped support posts, support posts of other shapes can be used without departing from the scope of the invention. It will be appreciated that the underlying principles of the invention can be used to provide a collar that is contoured to fit around a support post of many shapes and fitted with a rotatable flipper also contoured to complement the outer surface of a wedge member engaged with the support post, or the tapered face of the support post. For example, in addition to the generally tri-lobal shaped posts shown in the figures, posts for use in the second and third aspects of the present invention also can be of a generally round cross-section. When such posts are used in those aspects, the face of the wedge member, or of the wedging portion, is curved, for example, concavely, to correspond to the curvature of the surface of the post.

As the foregoing description of the preferred embodiments describes, an advantage of the present invention is that it allows a user to quickly and easily change the height of the supported item, e.g., a shelf, to accommodate a variety of shelving applications. Moreover, since the support system allows the shelf frame to slide over the wedge member mounted on the support posts, height adjustment is easy and can be done without tools or without having to remove adjacent shelves. The shelf-aligning feature of the invention further eases assembly and/or adjustment of the shelving system. And, since the structure providing the inclined plane is trapped within the support assembly, or integrally formed in the support post, there are no loose wedges to contend with.

Although specific embodiments of the present invention have been described above in detail, it will be understood that this description is merely for purposes of illustration. Various modifications of and equivalent structures corresponding to the disclosed aspects of the preferred embodiments in addition to those described above may be made by those skilled in the art without departing from the spirit of the present invention which is defined in the following claims, the scope of which is to be accorded the broadest interpretation so as to encompass such modifications and equivalent structures.

What is claimed is:

1. A support system, comprising:
   a support post having a tapered face; and
   support means for adjustably supporting a member to said support post, said support means including a locking mechanism movable between a first position for press-fitting said support means against the tapered face of said support post and a second position for releasing the press-fitting, said locking mechanism having a surface that abuts said tapered face of said support post when in the first position thereby to effect said press-fitting and that is released from the tapered face of said support post when moved to said second position to release said press-fitting.

2. A support system according to claim 1, wherein said support means comprises a collar adapted to be structurally associated with the supported member, and said locking mechanism is rotatably supported by said collar, with said locking mechanism and said collar forming a sleeve surrounding said support post.

3. A support system according to claim 2, wherein said collar is contoured to complement a cross-sectional shape of said support post.

4. A support system according to claim 3, wherein said support post has a generally triangular cross-section with a rounded right angular apex.

5. A support system according to claim 3, wherein said support post has a generally D-shaped cross-section.

6. A support system according to claim 3, wherein said collar comprises first and second lateral sides and a rear section, connecting said first and second lateral sides, having a shape to complement the cross-sectional shape of said support post.

7. A support system according to claim 6, wherein said collar further comprises means for securing said locking mechanism.

8. A support system according to claim 7, wherein said securing means comprises a cylindrical shaft secured between said first and second lateral sides of said collar.

9. A support system according to claim 8, wherein said cylindrical shaft is secured between upper portions of said first and second lateral sides of said collar.

10. A support system according to claim 8, wherein said cylindrical shaft is secured between middle portions of said first and second lateral sides of said collar.

11. A support system according to claim 8, further comprising a sleeve, said sleeve being contoured to fit between said collar and said post.

12. A support system according to claim 1, wherein said support post is formed so as to have plural tapered faces spaced along its length.

13. A support system according to claim 1, wherein said locking mechanism has a rear face mating with an outer surface of the tapered face of said support post.

14. A support system according to claim 13, wherein said outer surface and said rear face are substantially flat to complement each other.

15. A support system according to claim 13, wherein said outer surface is convex and said rear face is concave to complement each other.

16. A support system according to claim 1, wherein when said locking mechanism is in the second position, the support means can pass over the tapered face of said support post.

17. A support system according to claim 1, with said support means being translatable relative to said support post, wherein when said support means translates in a first direction said locking mechanism passes over the tapered face of said support post and when said support means translates in a second direction said locking mechanism seats on the tapered face of said support post and creates a wedging force.

18. A support system according to claim 17, further comprising means for actuating said locking mechanism toward the second position when said support means slides in the first direction or second direction to allow said locking mechanism to pass over the tapered face of said support post.

19. A support system according to claim 1, wherein said locking mechanism rotates about an axis when said surface abuts the tapered face of said support post.

20. A support system according to claim 1, wherein said locking mechanism rotates about an axis transverse to a longitudinal axis of said support post when said surface abuts the tapered face of said support post.

21. A support system according to claim 1, wherein said support post is made by the roll-form process.

22. A support system according to claim 1, wherein said support post is made by the hydro-forming process.

23. A support system according to claim 1, wherein said support post is made by the pultrusion process.

24. A system for supporting a member, said system comprising:
   a support post having a longitudinal axis and a tapered face; and
   support means adapted to be secured to the member, for supporting the member to said support post, said support means forming a sleeve around said support post and seated on said support post on the tapered face thereof, wherein
   said support means including a locking mechanism that is actuatable between a first position compressing the tapered face and supporting the member and a second position not compressing the tapered face.

25. A system according to claim 24, wherein said locking mechanism in the first position supports the member by a wedge action with said tapered face.

26. A system according to claim 24, wherein said locking mechanism in the second position releases the compressive force applied to the tapered face of said support post.

27. A system according to claim 24, wherein said locking mechanism in the second position is slidable over the tapered face of said support post.

28. A system according to claim 24, wherein said support assembly comprises a collar adapted to be structurally associated with the member, with said locking mechanism rotatably supported on said collar.

29. A system according to claim 28, wherein said locking mechanism has a rear face mating with an outer surface of the tapered face.

30. A system according to claim 29, wherein said outer surface and said rear face are substantially flat to complement each other.

31. A system according to claim 29, wherein said outer surface is convex and said rear face is concave to complement each other.

32. A system according to claim 29, wherein said outer surface is angled and said rear face has an angled cavity to complement each other.

33. A system according to claim 29, wherein said outer surface has a raised vertical section thereof.

34. A system according to claim 28, wherein said collar includes first and second lateral sides and a rear section connecting said first and second lateral sides, said rear section shaped to complement a contour of said support post.

35. A system according to claim 34, wherein said support post has a generally triangular cross-section with a rounded right angular apex.

36. A support system according to claim 34, wherein said support post has a generally D-shaped cross-section.

37. A system according to claim 34, wherein said collar further comprises means for securing said locking mechanism.

38. A system according to claim 37, wherein said securing means comprises a cylindrical shaft secured between said first and second lateral sides of said collar.

39. A system according to claim 38, wherein said cylindrical shaft is secured between upper portions of said first and second lateral sides of said collar.

40. A system according to claim 38, wherein said cylindrical shaft is secured between middle portions of said first and second lateral sides of said collar.

41. A system according to claim 28, wherein said locking mechanism has a flat lower portion.

42. A system according to claim 28, wherein said locking mechanism has a rounded lower portion.

43. A system according to claim 28, wherein said locking mechanism has an elongated lower portion forming a handle.

44. A system according to claim 24, with said sleeve receiving said support post and translatable relative thereto, wherein when said support assembly translates in a first direction said locking mechanism passes over the tapered face of said support post and when said support assembly translates in a second direction said locking mechanism seats on the tapered face of said support post and creates a wedging force.

45. A system according to claim 24, further comprising means for actuating said locking mechanism toward the second position when said support assembly slides in the first direction and the second direction to allow said locking mechanism to pass over the tapered face of said support post.

46. A system according to claim 24, wherein said support post includes a plurality of tapered faces extending along a length of said support post.

47. A system according to claim 24, wherein said support post is made by the roll-form process.

48. A system according to claim 24, wherein said support post is made by the hydro-forming process.

49. A system according to claim 24, wherein said support post is made by the pultrusion process.

* * * * *